US012614855B2

(12) United States Patent
Hussain et al.

(10) Patent No.: US 12,614,855 B2
(45) Date of Patent: Apr. 28, 2026

(54) SINGLE ELLIPTICAL LOADED STRIP ANTIPODAL VIVALDI ANTENNA (SELS-AVA)

(71) Applicant: KING FAHD UNIVERSITY OF PETROLEUM AND MINERALS, Dhahran (SA)

(72) Inventors: Rifaqat Hussain, Dhahran (SA); Bismah Tariq, Dhahran (SA); Muhammad Amjad, Dhahran (SA); Abdul Aziz, Dhahran (SA); Abdullah Al-Garni, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 177 days.

(21) Appl. No.: 18/535,244

(22) Filed: Dec. 11, 2023

(65) Prior Publication Data

US 2025/0192442 A1 Jun. 12, 2025

(51) Int. Cl.
*H01Q 13/08* (2006.01)
*H01Q 1/50* (2006.01)

(52) U.S. Cl.
CPC ............. *H01Q 13/085* (2013.01); *H01Q 1/50* (2013.01)

(58) Field of Classification Search
CPC ............................... H01Q 13/085; H01Q 1/50
See application file for complete search history.

(56) References Cited

U.S. PATENT DOCUMENTS 9,504,404 B1 11/2016 Shao et al.
10,186,783 B2 * 1/2019 Liao ...................... H01Q 13/08
(Continued)

FOREIGN PATENT DOCUMENTS

CN 107086361 A 8/2017
CN 113809532 A * 12/2021 ............... H01Q 1/50
CN 116598757 A * 8/2023 ............... H01Q 1/36

OTHER PUBLICATIONS

Nassar et al. ; A Novel Method for Improving Antipodal Vivaldi Antenna Performance ; IEEE Transactions on Antennas and Propagation ; Jul. 2015 ; 6 Pages.
(Continued)

*Primary Examiner* — Seung H Lee
(74) *Attorney, Agent, or Firm* — Oblon, McClelland, Maier & Neustadt, L.L.P.

(57) ABSTRACT

A single elliptical loaded strip antipodal Vivaldi antenna (SELS-AVA) is formed on a substrate. The SELS-AVA includes a first elliptical flare and a second elliptical flare. A first microstrip feedline is connected to the first elliptical flare and a second microstrip is connected to the second elliptical flare. A base structure is connected to a second end of the second microstrip feedline. The SELS-AVA includes a first elliptical conducting strip connected to the first elliptical flare and a second elliptical conducting strip connected to the second elliptical flare. The second elliptical conducting strip is a mirror image of the first elliptical conducting strip. The SELS-AVA further includes a feed port having a positive terminal and a negative terminal. The SELS-AVA is configured to radiate at a lower cut-off frequency $\lambda_L$ of about 0.69 GHz when an electrical signal is applied to the feed port.

5 Claims, 16 Drawing Sheets

(56) References Cited

U.S. PATENT DOCUMENTS

2008/0068175 A1* 3/2008 Hockey .................... H01Q 9/16
340/572.7
2010/0145190 A1* 6/2010 Bourqui ............... H01Q 13/085
600/425

OTHER PUBLICATIONS

Dixit et al. ; A Survey of Performance Enhancement Techniques if Antipodal Vivaldi Antenna ; IEEE Access ; Mar. 16, 2023 ; 23 Pages.

Natarajan et al. ; Modified antipodal Vivaldi antenna for ultra-wideband communications ; IET Microwaves, Antennas & Propagation, vol. 10, Issue 4 ; Mar. 1, 2016 ; 14 Pages.

Abdelbaky et al. ; Modified Elliptical Antipodal Vivaldi Antenna with Elliptical Tapered Slot Edge and Circular loads ; 2017 International Workshop on Antenna Technology: Small Antennas, Innovative Structures, and Applications (IWAT) ; Mar. 1, 2017 ; 4 Pages.

Tariq, et al. ; Computational Analysis for Miniaturization of Tapered Slot Antenna using Elliptical Conducting Loading Strips ; Aces Journal, vol. 37, No. 6 ; Jun. 2022 ; 7 Pages.

* cited by examiner

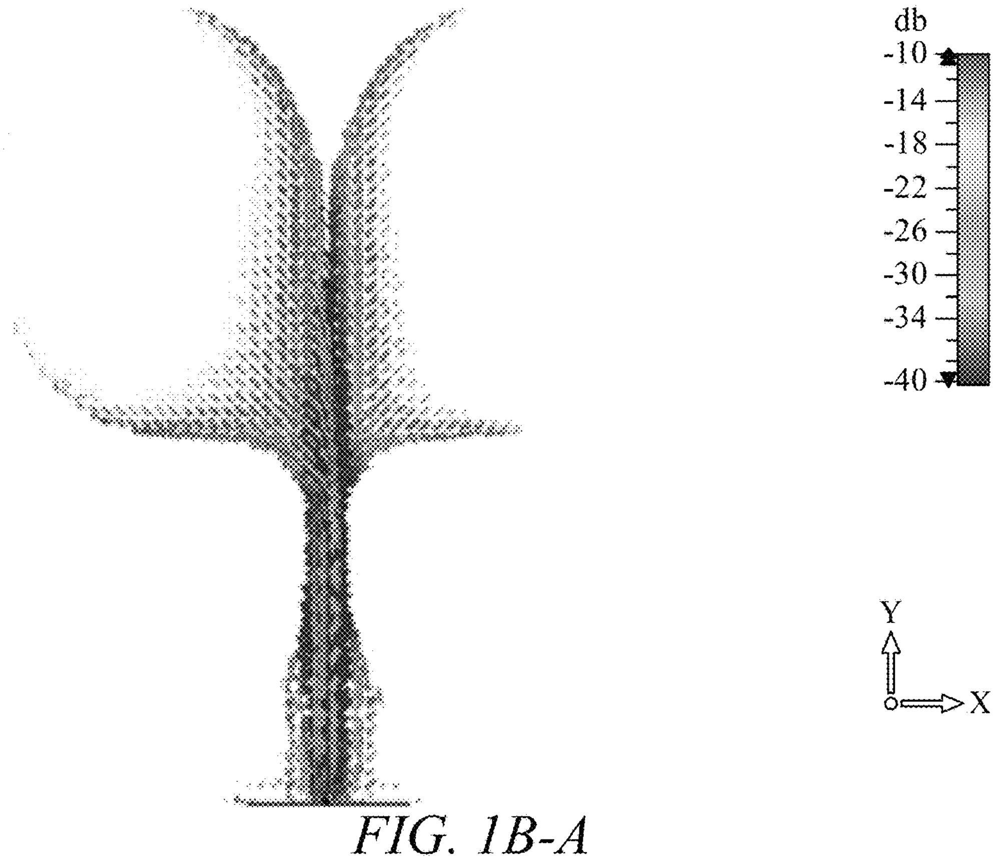
*FIG. 1B-A*
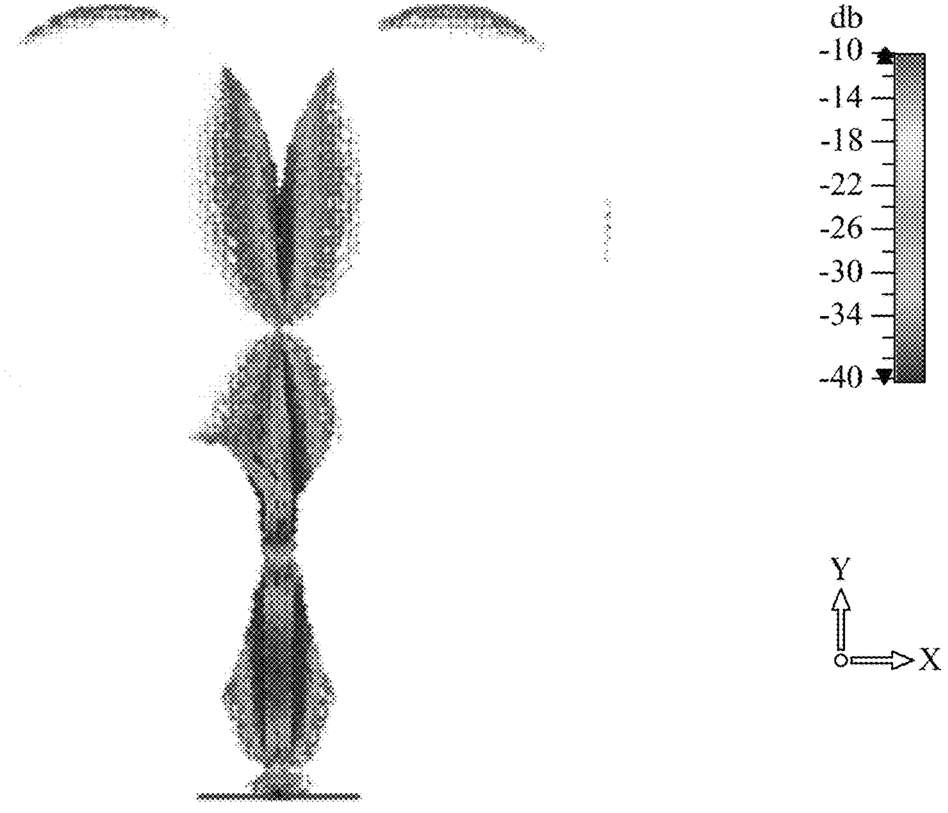
*FIG. 1B-B*

SINGLE ELLIPTICAL LOADED STRIP ANTIPODAL VIVALDI ANTENNA (SELS-AVA)

STATEMENT REGARDING PRIOR DISCLOSURE BY THE INVENTORS

Aspects of this technology are described in an article "Computational Analysis for Miniaturization of Tapered Slot Antenna using Elliptical Conducting Loaded Strips", published in ACES Journal, Vol. 37, No. 6, on Dec. 15, 2022, which is incorporated herein by reference in its entirety.

BACKGROUND

Technical Field

The present disclosure is directed to antenna technologies and, in particular, to a single elliptical loaded strip antipodal Vivaldi antenna.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Wireless remote-controlled systems integrated with the Internet of Things (IoT) are being accepted for their convenience and efficiency in daily activities, facilitating multitasking for users. The IoT infrastructure necessitates a broad frequency spectrum, which is adequately provided by ultra-wideband antennas. These antennas are capable of operating from extended ranges down to sub-GHz frequencies. This characteristic is beneficial due to a broader frequency coverage and reduced power requirements. Consequently, they are well-suited for network configurations that periodically transmit small data packets, such as those found in IoT networks. Applications include, but are not limited to, chaos-based communication systems, RFID tagging, air quality monitoring sensor networks, and wireless devices such as drones and microphones.

An antenna capable of functioning effectively in high-frequency domains and the sub-GHz spectrum is particularly valuable for energy harvesting mechanisms in systems with low energy demands. Antipodal Vivaldi antennas represent a group of antennas that show considerable promise in fulfilling various transmission requirements due to their expansive bandwidth, enhanced directivity, elevated radiation efficiency, and consistent radiation pattern attributes. These antennas have garnered significant interest from the research community, especially for their applicability in energy harvesting.

There have been initiatives to augment the performance and compact the size of the traditional Vivaldi and antipodal Vivaldi antennas, especially for usage within the sub-GHz band. Nonetheless, the challenge remains to reduce their size further while maintaining effective operation within the sub-GHz frequencies to make them more viable for energy harvesting purposes.

To address size reduction and performance improvement of the antipodal Vivaldi antenna, various flare shapes and tapering methods have been implemented. The application of meta-material unit cells to the antenna's substrate sides has proven beneficial in increasing gain and minimizing both antenna size and sidelobe levels. Additionally, the antenna's gain can be further enhanced through the integration of substrate integrated waveguide structures and the application of corrugation techniques, albeit at the cost of increased fabrication complexity. Traditional methods such as resistance loading and slotting are also employed for antenna miniaturization and gain enhancement.

Patent Application CN107086361A describes a high-gain antipodal Vivaldi antenna comprising a medium substrate, a balanced feed balun, an upper-layer radiation patch, a lower-layer radiation patch having a central "oval, director" patch between the flares. The antenna operates in the 1 GHz to 40 GHz range. However, the antenna fails to radiate at a frequency of about 0.69 GHz, and also, does not utilize the elliptical strips.

U.S. Pat. No. 9,504,404B1 describes a Vivaldi antenna with lobe designs that operate in the 1 GHz to 2.7 GHz frequency range. However, the antenna fails to radiate at a frequency of about 0.69 GHz, and also, does not utilize the elliptical strips.

Each of the aforementioned techniques suffers from one or more drawbacks hindering their adoption. Aforementioned techniques tend to be complex, and achieving size reduction for antipodal Vivaldi antennas in sub-GHz applications remains a challenge. Moreover, the analysis of such wideband antennas is hindered by significant computational time and cost.

Accordingly, it is one object of the present disclosure to provide methods and systems for enhancing antipodal Vivaldi antenna that uses simple techniques of achieving reduction in the antenna size with comparable radiation and gain performance in the sub-GHz range without affecting the antenna performance at higher frequencies.

SUMMARY

In an exemplary embodiment, a single elliptical loaded strip antipodal Vivaldi antenna (SELS-AVA) includes a substrate, a first central axis, and a second central axis. The substrate includes a top side, a bottom side, a first edge, a second edge parallel to the first edge, a third edge perpendicular to the first edge and the second edge, and a fourth edge parallel to the third edge. The first central axis extends from the first edge to the second edge. The second central axis extends from the third edge to the fourth edge.

The SELS-AVA further includes a first elliptical flare formed on the top side between the third edge and the first central axis, and a first microstrip feedline having a first end connected to the first elliptical flare. The first microstrip feedline is configured to extend from the second central axis to the second edge and has a length centered on the first central axis.

The SELS-AVA further includes a second elliptical flare formed on the bottom side between the first central axis and the fourth edge. The second elliptical flare is a mirror image of the first elliptical flare. The SELS-AVA has a second microstrip feedline having a first end connected to the second elliptical flare. The second microstrip feedline is configured to extend from the second central axis towards the second edge and has a length centered on the first central axis.

The SELS-AVA also includes a base structure connected to a second end of the second microstrip feedline, a first elliptical conducting strip connected to the first elliptical flare, and a second elliptical conducting strip connected to the second elliptical flare. The first elliptical conducting strip is located between the third edge and the first central axis and between the second central axis and the second edge. The second elliptical conducting strip is a mirror image of the first elliptical conducting strip. The second elliptical conducting strip is located between the first central axis and the fourth edge and between the second central axis and the second edge.

The SELS-AVA further includes a feed port having a positive terminal and a negative terminal. The positive terminal is connected to a second end of the first microstrip feedline and the negative terminal is connected to the base. The SELS-AVA is configured to radiate at a lower cut-off frequency $\lambda_L$ of about 0.69 GHz when an electrical signal is applied to the feed port.

In another exemplary embodiment, a method for fabricating a single elliptical loaded strip antipodal Vivaldi antenna (SELS-AVA) includes obtaining a substrate including a top side, a bottom side, a first edge, a second edge parallel to the first edge, a third edge perpendicular to the first edge and the second edge, and a fourth edge parallel to the third edge, a first central axis which extends from the first edge to the second edge, and a second central axis which extends from the third edge to the fourth edge.

The method further includes fabricating, by a metallization process, a first elliptical flare on the top side between the third edge and the first central axis. The first elliptical flare has a minor axis of length fr1 and a major axis of length fr2.

The method further includes fabricating, by a metallization process, a first microstrip feedline having a first end connected to the first elliptical flare. The first microstrip feedline is configured to extend from the second central axis to the second edge and has a length centered on the first central axis.

The method further includes fabricating, by a metallization process, a second elliptical flare on the bottom side between the first central axis and the fourth edge. The second elliptical flare is a mirror image of the first elliptical flare.

The method further includes fabricating, by a metallization process, a second microstrip feedline having a first end connected to the second elliptical flare. The second microstrip feedline is configured to extend from the second central axis towards the second edge and has a length centered on the first central axis.

The method further includes fabricating, by a metallization process, a base structure connected to a second end of the second microstrip feedline.

The method further includes fabricating, by a metallization process, a first elliptical conducting strip connected to the first elliptical flare. The first elliptical conducting strip is located between the third edge and the first central axis and between the second central axis and the second edge. The first elliptical conducting strip has a minor axis of length ar1 and a major axis of length ar2.

The method further includes fabricating, by a metallization process, a second elliptical conducting strip connected to the second elliptical flare. The second elliptical conducting strip is a mirror image of the first elliptical conducting strip. The second elliptical conducting strip is located between the first central axis and the fourth edge and between the second central axis and the second edge.

The method further includes fabricating, by a metallization process, a feed port having a positive terminal and a negative terminal such that the positive terminal is connected to a second end of the first microstrip feedline and the negative terminal is connected to the base.

In one aspect of the method, the length ar1 is about 46% of the length fr1 and the length ar2 is about 88% of the length fr2, a length between the first edge and the second edge is about 0.359 $\lambda_L$ mm and a width between the third edge and the fourth edge is about 0.312 $\lambda_L$ mm, where $\lambda_L$ is a lower cut-off frequency of about 0.69 GHz of the SELS-AVA, and causing the SELS-AVA to radiate at the lower cut-off frequency $\lambda_L$ of about 0.69 GHz by applying an electrical signal to the feed port.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1B-A-FIG. 1B-B show the surface current distribution analysis for the CAVA, according to certain embodiments.

DETAILED DESCRIPTION

Figure 1A:
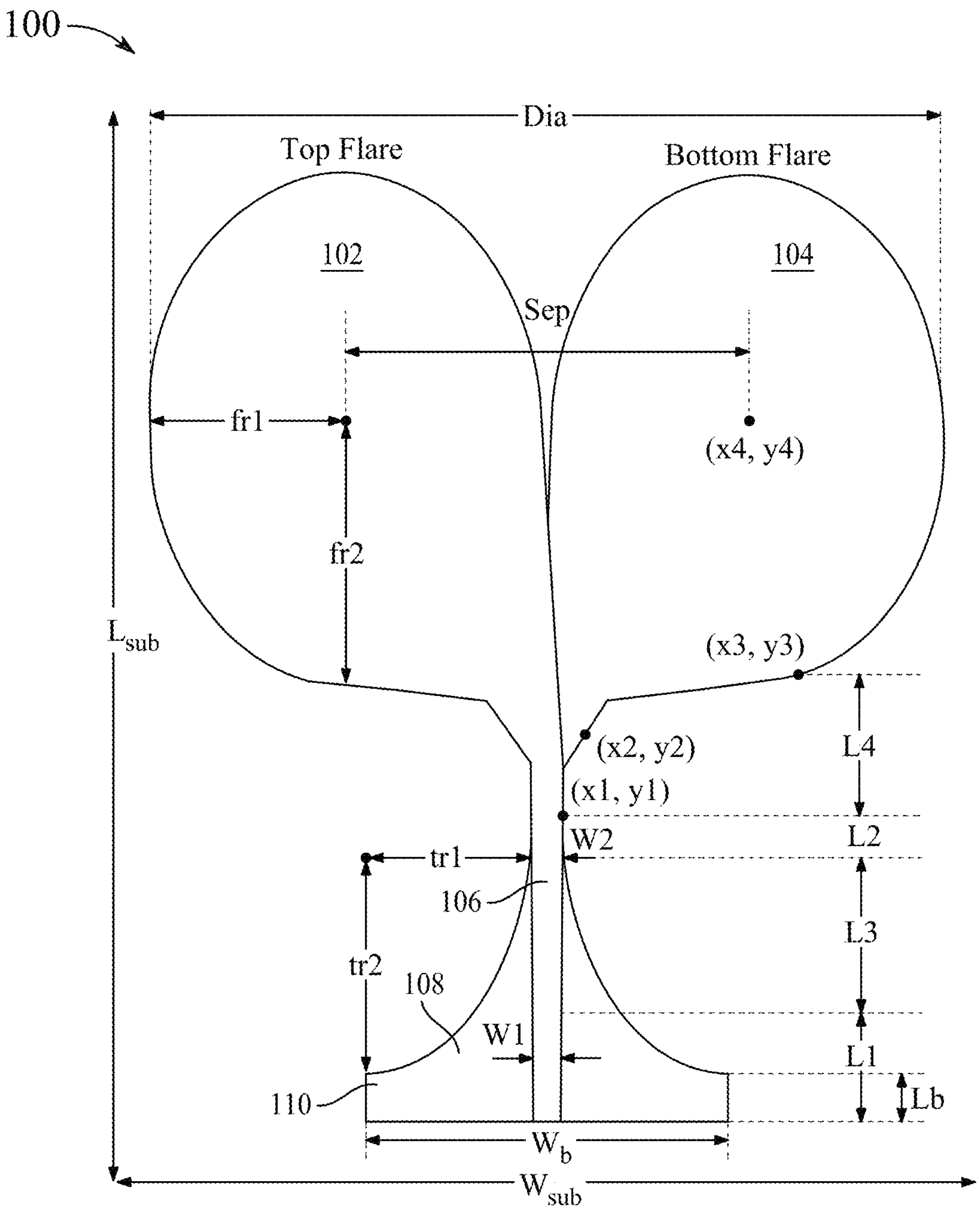
FIG. 1A depicts structural formation of a conventional antipodal Vivaldi antenna (CAVA), according to certain embodiments.

In the drawings, like reference numerals designate identical or corresponding parts throughout the several views. Further, as used herein, the words “a”, “an” and the like generally carry a meaning of “one or more”, unless stated otherwise.

Furthermore, the terms “approximately,” “approximate”, “about” and similar terms generally refer to ranges that include the identified value within a margin of 20%, 10%, or preferably 5%, and any values therebetween.

Aspects of this disclosure are directed to a single elliptical loaded strip antipodal Vivaldi antenna (SELS-AVA). The SELS-AVA has elliptical-shaped conducting strips loaded on a first flare and a second flare. The first flare and first elliptical conducting strip are formed on a top side of a substrate and the second flare and a second elliptical conducting strip are formed on a bottom side of the substrate. Implementation of the elliptical conducting strips reduces the antenna size while yielding radiation and gain performance in the sub-GHz range without affecting the antenna performance at higher frequencies.

FIG. 1A depicts structural form of a conventional antipodal Vivaldi antenna (CAVA), in accordance with one embodiment. As known in the art, Vivaldi antennas are a family of a travelling-wave antennas. The wideband properties of the antenna are derived from the exponentially tapered flares and the gradual broadening of the antenna’s aperture. Vivaldi antennas effectively facilitate the acceleration of electromagnetic waves to the velocity of unobstructed space propagation. One major type of Vivaldi antennas is the antipodal Vivaldi antenna (AVA). In AVA structure, two flares (top flare and bottom flare) are antipodal as they are present on opposite sides of the substrate. The top flare acts as a conductor, and the bottom flare acts as a ground. Both the flares are mirror images of one another.

The CAVA includes a substrate and two elliptical flares. A first CAVA elliptical flare 102 and a second CAVA elliptical flare 104 are formed on the substrate. The first CAVA elliptical flare 102 includes a first CAVA microstrip feedline 106. The second CAVA elliptical flare 104 includes a second CAVA microstrip feedline 108. The second CAVA microstrip feedline 108 is connected to a base structure (110, 222).

The antenna flare includes three sections. In the first section, the antenna flare transitions, in a circularly tapered structure, from a microstrip line to a double-sided parallel strip line. The second section is a parallel strip line, which is a balanced structure providing wide-band transitions. The third section is an elliptical radiation flare. The microstrip line and ground plane are on different sides of the substrate and gradually flare out in opposite directions to form the tapered slot. All structural parameters of the CAVA are described in detail with reference to FIG. 2A.

The CAVA is preferred for its small size in various applications. An initial aperture size D of the CAVA is the parameter based on which lower cutoff frequency $f_L$ of the CAVA is decided through an empirical relation given as:

$$D = \frac{c}{f_L}\frac{1}{1.5\sqrt{\varepsilon_r + 1}}. \tag{1}$$

In equation (1), c is the velocity of light in free space and $\varepsilon_r$ is the relative permittivity of a dielectric substrate. The significance of the aperture size is derived from the fact that, if the aperture size is less than the value obtained from equation (1) then the aperture size negatively affects the broadband characteristics of the antenna.

As known in the art, the Vivaldi antennas incorporate a tapered slot, fabricated by etching into a metal layer, which may be supported by a dielectric substrate. The tapered slot is configured as such to operate the antenna across a wide range of frequencies, effectively focusing the radiated signal into a directional beam with enhanced strength and reduced side signal emissions. A critical consideration in defining process is a selection of appropriate techniques to feed the signal into the antenna, optimized for the Vivaldi antenna type.

The length of the tapered slot is devised to be approximately equal to the wavelength at the lowest intended frequency of operation. Furthermore, the tapered slot length is a function of both cavity diameter and overall length of the antenna, with a longer tapered slot contributing to a broader operational frequency range.

The rate at which the slot narrows, defined as a taper rate, is determined by an exponential function is quoted as equation (2):

$$y = \pm Ae^{px}, \tag{2}$$

where A and p are constants, non-zero real numbers.

For better impedance characteristics, the slot is typically exponentially tapered as per the equation (3):

$$x = \left\{ \begin{array}{c} w_1 - 0.5\ w_1 e^{\alpha y} Toplayer \\ -w_1 + 0.5\ w_1 e^{\alpha y} Bottomlayer \end{array} \right\}. \tag{3}$$

In equation (3), $w_1$ is the width of the feeding microstrip and α is the exponential rate of transition and is determined by the equation (4):

$$\alpha = \frac{1}{l_{eff}}\left(\frac{w_1 + 0.5\ D}{0.5\ w_1}\right), \tag{4}$$

where $l_{eff}$ is the effective radiation length. All the design parameters for CAVA are summarized in Table 1. Based on equations (2), (3) and (4), A=0.5 and p=α, where $w_1$ is given in Table 1 below.

The CAVA has a lower cutoff frequency ($Fr_L$) of 0.83 GHz with size of 0.446 $\lambda_L$×0.387 $\lambda_L$, where $\lambda_L$ is the wavelength in free space at the lowest cutoff frequency.

FIG. 1B-A and FIG. 1B-B show a surface current distribution analysis of the CAVA, in accordance with one embodiment. The surface current distribution analysis is critical for adjusting the structural design of the CAVA to lower its minimum operating frequency without enlarging its physical opening. The patterns of current flow on CAVA’s surface at frequencies of 0.69 GHz and 2.5 GHz are depicted in FIGS. 1B-A and 1B-B, respectively. Observations indicate that at 0.69 GHz, there is a concentration of surface currents at the lower bends of the radiating elements and the gap between them. In contrast, at 2.5 GHz, currents are primarily confined to the area around the gap, with negligible activity at the flare’s lower bends. Such distribution indicates that the lower contours of the radiating elements are instrumental in defining CAVA's lower frequency threshold. By extending the electrical pathway along these lower bends, it may be possible to decrease the antenna's minimum frequency of operation without increasing the aperture size.

Figure 2A:
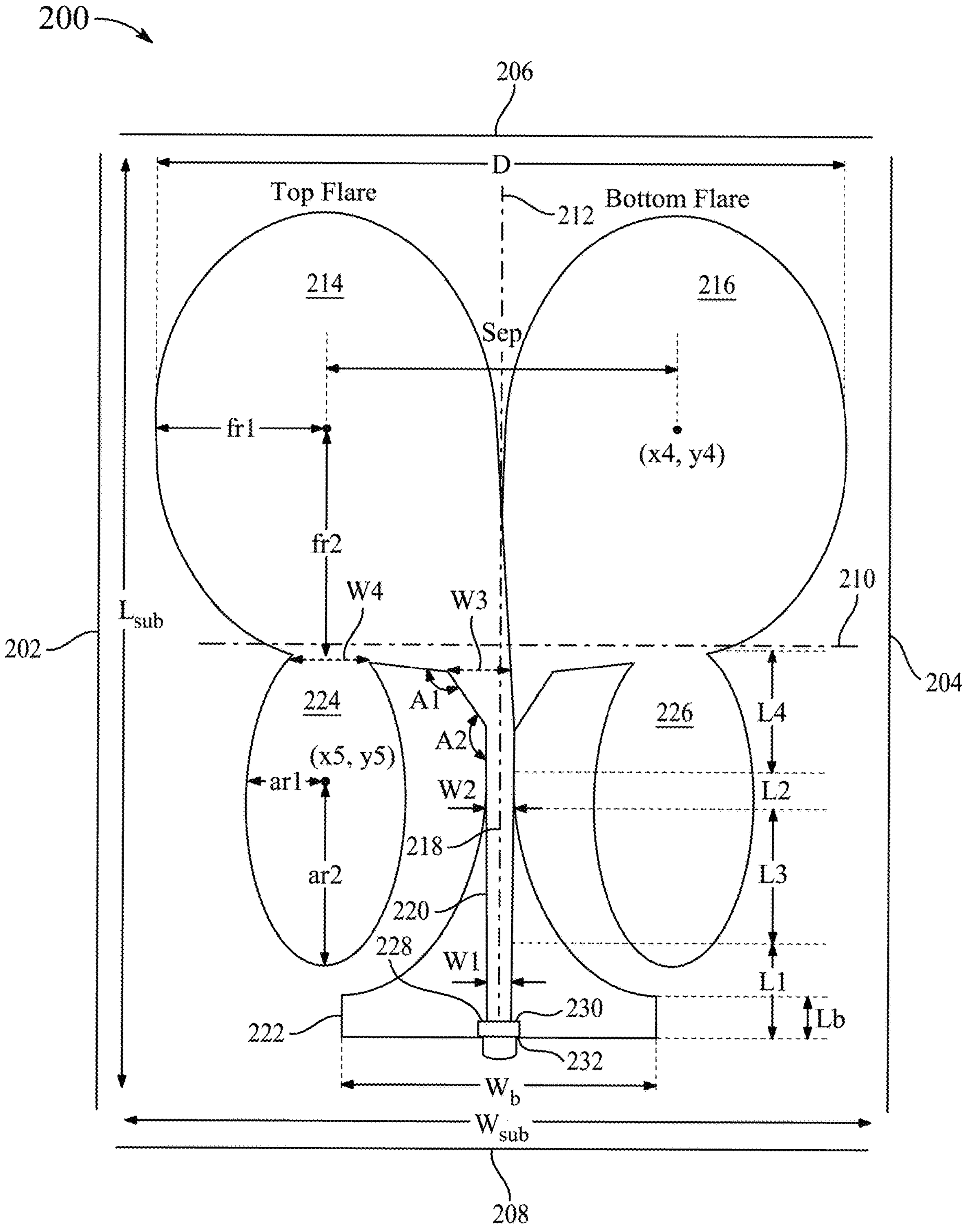
FIG. 2A illustrates a structural formation of a single elliptical loaded strip antipodal Vivaldi antenna (SELS-AVA), according to certain embodiments.

In the present disclosure, the electrical pathways of the CAVA are modified by the addition of a pair of elliptical conducting strips 224, 226. FIG. 2A illustrates a structural formation of a single elliptical loaded strip antipodal Vivaldi antenna (SELS-AVA), in accordance with the present disclosure. The structural formation of the SELS-AVA is further described in view of the structural formation of the CAVA, as shown in FIG. 1A.

In an aspect of the embodiment, the SELS-AVA includes a substrate. In one example, the substrate is a dielectric substrate. The antenna elements are formed on the substrate. In one implementation, the antenna elements are etched from the substrate. In another implementation, the antenna elements are printed on the substrate. In one implementation of the printing, the antenna elements are printed on the substrate with copper. In some implementations of the printing, the antenna elements are printed on the substrate with at least one of iridium, brass, iron, silver, and aluminum ink. Other implementations not described here are contemplated herein.

The substrate includes a top side and a bottom side. The substrate has four edges. A first edge 202, a second edge 204, a third edge 206, and a fourth edge 208. The second edge 204 is parallel to the first edge 202, and the fourth edge 208 is parallel to the third edge 206. The third edge 206 is perpendicular to the first edge 202 and the second edge 204. Similarly, the fourth edge 208 is perpendicular to the first edge 202 and the second edge 204. A length between the first edge 202 and the second edge 204 is about 0.359 $\lambda_L$ mm and a width between the third edge 206 and the fourth edge 208 is about 0.312 $\lambda_L$ mm. The substrate includes a first central axis 210 which extends from the first edge 202 to the second edge 204, and a second central axis 212 which extends from the third edge 206 to the fourth edge 208. $\lambda_L$ refers to the operating frequency of the antenna. The lengths of the substrate are chosen so that the antenna dimensions are multiples of one quarter wavelength.

The SELS-AVA further includes two elliptical flares formed on the substrate, a first elliptical flare 214 and a second elliptical flare 216. The first elliptical flare 214, alternatively referred to as a top flare, is formed on the top side of the substrate, between the third edge 206 and the first central axis 210, and between the first edge 202 and the second central axis 212, consuming the area of a second quadrant on the substrate. The first elliptical flare 214 has a minor axis of length fr1 and a major axis of length fr2, measured from a center of the first elliptical flare 214.

The first elliptical flare 214 of the SELS-AVA further includes a first microstrip feedline 218 having a first end connected to the first elliptical flare 214. The first microstrip feedline 218 is configured to extend from the first central axis 210 to the fourth edge 208 and has a length centered on the second central axis 212.

In one aspect, the second elliptical flare 216, alternatively referred to as a bottom flare, is formed on the bottom side of the substrate, between the first central axis 210 and the third edge 206, consuming the area of the first quadrant on the substrate. The second elliptical flare 216 is a mirror image of the first elliptical flare 214, having identical measurements of minor axis fr1 and major axis fr2. The SELS-AVA also includes a second microstrip feedline 220 having a first end connected to the second elliptical flare 216. The second microstrip feedline 220 is configured to extend from about the first central axis 210 towards the second edge 204 and has a length centered on the second central axis 212.

The SELS-AVA further includes a base structure (110, 222) connected to a second end of the second microstrip feedline 220. As described with reference to CAVA as shown in FIG. 1A, the tapered slot is formed by the separation between the upper regions of the first elliptical flare 214 and the second elliptical flare 216. The microstrip feedlines gradually narrow towards the base structure (110, 222). The base structure (110, 222) houses a ground plane on the bottom side of the substrate where the second elliptical flare 216 transitions to the second microstrip feedline 220. The second end of the first microstrip feedline 218 is connected to the ground plane.

In order to extend the electrical pathways, elliptical conducting strips are added to the antenna. A first elliptical conducting strip 224 is connected to the first elliptical flare 214. The first elliptical conducting strip 224 is located between the fourth edge 208 and the first central axis 210 and between the second central axis 212 and the first edge 202 in a third quadrant of the substrate. The first elliptical conducting strip 224 has a minor axis of length ar1s and a major axis of length ar2, measured from the center of the first elliptical conducting strip 224.

Similarly, a second elliptical conducting strip 226 is connected to the second elliptical flare 216. The second elliptical conducting strip 226 is a mirror image of the first elliptical conducting strip 224, having identical measurements of ar1 and ar2. The second elliptical conducting strip 226 is located between the first central axis 210 and the fourth edge 208 and between the second central axis 212 and the second edge 204 in a fourth quadrant of the substrate.

FIG. 2A shows structural parameters of the SELS-AVA. As described earlier, the SELS-AVA is configured on the CAVA. Therefore, the structural parameters of the CAVA as shown in FIG. 1A will remain the same for the SELS-AVA. Additional structural parameters of the SELS-AVA corresponding to the elliptical conducting strips are determined based on parametric analysis and are listed in Table 1.

The width of the substrate is denoted by Wsub, and the length of the substrate is denoted by Lsub. A central axis of the first elliptical flare 214 is parallel to a central axis of the second elliptical flare 216 at a distance denoted by the "Sep" parameter. In an example, the Sep parameter equals 67 mm, as shown in Table 1. The base structure (110, 222) has width Wb and length Lb. The first microstrip feedline 218 has width $W_1$ at bottom side and $W_2$ the top side. The diameter of the antenna is represented by the D parameter. The tr1 and tr2 symbols are the parameters to control the tapering of the feed patch at the bottom flare.

In one aspect, the length fr1 of the first elliptical flare 214 is parallel to the first central axis 210 and to a minor axis of length ar1 of the first elliptical conducting strip 224.

The major axis of length fr2 of the first elliptical flare 214 is contiguous with a major axis of length ar2 of the first elliptical conducting strip 224. The major axis of the first elliptical flare 214 is parallel to the first central axis 210. A major axis of the second elliptical flare 216 is contiguous with a major axis of the second elliptical conducting strip 226, and the major axis of the second elliptical flare 216 is parallel to the second central axis 212.

The first elliptical conducting strip 224 is located between the fourth edge 208 and the first central axis 210 and between the second central axis 212 and the first edge 202. The length ar1 is about 47% of the length fr1, and the length ar2 is about 88% of the length fr2. The center of the first elliptical conducting strip 224 is denoted by (x5, y5).

The SELS-AVA includes a feed port 228 having a positive terminal 230 and a negative terminal 232. The positive terminal 230 is connected to a second end of the first microstrip feedline 218 and the negative terminal 232 is connected to the base. In one aspect, the SELS-AVA is configured to radiate at a lower cut-off frequency $\lambda_L$ of about 0.69 GHz when an electrical signal is applied to the feed port.

A first tapered structure, alternatively referred to as the tapered slot, is configured to connect the first end of the first microstrip feedline 218 to a portion of the first elliptical flare 214. The transition from the first microstrip feedline 218 to the first elliptical flare 214 is contiguous with the second central axis 212. The first elliptical flare 214 is connected to the first microstrip feedline 218 at a connection segment W4. The width of the connection segment W4 is a dependent control parameter. W4 is varied as a result of variation in the values of major and minor axes (ar1 and ar2) of the elliptical loaded strip. The effect of variation in the parameters ar1 and ar2 on the antenna response is discussed with reference to subsequent figures. The width W4 is calculated as 21.53 mm corresponding to the optimum values of ar1 and ar2. The width W3 is the width of the first end of the first microstrip feedline and is determined to have a value of 11.57 mm.

In one implementation, the first tapered structure forms an angle A1 of about 132 degrees with the first elliptical flare 214 and forms an angle A2 of about 145 degrees with the first microstrip feedline 218. Similar to the first tapered structure, a second tapered structure, alternatively referred to as the tapered slot, is configured to connect the first end of the second microstrip feedline 220 to a portion of the second elliptical flare 216, which is contiguous with the second central axis 212. In one implementation, the second tapered structure forms an angle of about 132 degrees with the second elliptical flare 216 and forms an angle of about 145 degrees with the second microstrip feedline 220.

The values of the structural parameters are enlisted in Table 1. All the dimensions are measured in millimeters.

TABLE 1

Antenna design parameters and values

| Parameters | Value | Parameters | Value |
|---|---|---|---|
| CAVA | | | |
| Lsub | 161.25 | x1 | 2.975 |
| Wsub | 140 | y1 | 60 |
| fr1 | 32.5 | x2 | 10 |
| fr2 | 42.25 | y2 | 70 |
| tr1 | 43.2 | x3 | 33.5 |
| tr2 | 27 | y3 | 72.75 |
| D | 132 | x4 | 33.5 |
| Sep | 67 | y4 | 115 |
| Lb | 8 | L2 | 10 |
| Wb | 60 | W2 | 5.95 |
| L1 | 7.5 | L3 | 42.5 |
| W1 | 4.65 | L4 | 12.75 |
| SELS-AVA | | | |
| ar1 | 15 | x5 | 33.5 |
| ar2 | 37 | y5 | 45 |

The base includes a tapered section and a rectangular section. The tapered section is configured to taper from the second end of the second microstrip feedline 220 along a circular curve on either side of the tapered section to the rectangular section. The second microstrip feedline 220 and the base 222 are centered about the first central axis 210. In one aspect, the rectangular section is configured to fit within an opening of the feed port 228.

According to one aspect, the first elliptical flare 214, the first elliptical conducting strip 224, the first microstrip feedline 218, and the first tapered structure are a unitary structure fabricated in a metallic material on the top side of the substrate during a metallization process. Examples of the metallic material include, but are not limited to, copper, iridium, brass, iron, silver, aluminum, and graphene.

The second elliptical flare 216, the second elliptical conducting strip 226, the second microstrip feedline 220, the second tapered structure and the base are a unitary structure fabricated in the metallic material on the bottom side of the substrate during the metallization process. Examples of the metallic material include, but are not limited to, copper, iridium, brass, iron, silver, aluminum, and graphene. In an aspect, the metallic material is copper.

In one aspect of the embodiment, the metallization process is a printing process which uses conductive ink. A first layer is formed of the metallic material covering the top side of the substrate. A second layer is formed of the metallic material covering the bottom side of the substrate. The metallization process, in one example, includes etching the first layer and the second layer.

The SELS-AVA is configured to operate with a gain of in a range of about 1.3 $dB_i$ to about 2.2 $dB_i$ in a frequency range of about 0.668 GHz to about 1.0 GHz, and to have a peak gain of about 9.5 $dB_i$ in a frequency range of about 5 GHz to about 20 GHz.

The elliptical conducting strips are integrated into the antenna design in elliptical configuration, as opposed to rectangular or other stepped configurations, to enable a seamless wideband response, particularly at lower frequency spectrums. The elliptical conducting strips are specifically configured with the capability to provide wideband coverage paired with a consistent impedance bandwidth. For accurate modelling of the elliptical conducting strips, the finite-difference time-domain (FDTD) method was used. To accurately model these contours, the FDTD method incorporates perfect boundary approximation (PBA). PBA is based on the principle that the integral path required for the numerical resolution of Maxwell's equations in each grid cell can be aligned with the object's actual contours within the cell, rather than with the cell's edges or faces.

Figure 2B:
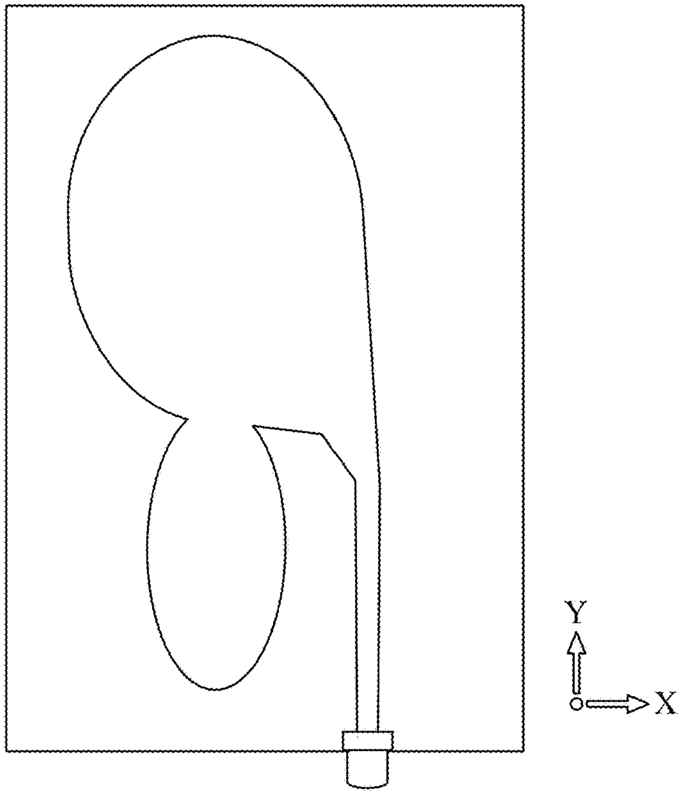
FIG. 2B shows a top layer view of SELS-AVA, according to certain embodiments.
Figure 2C:
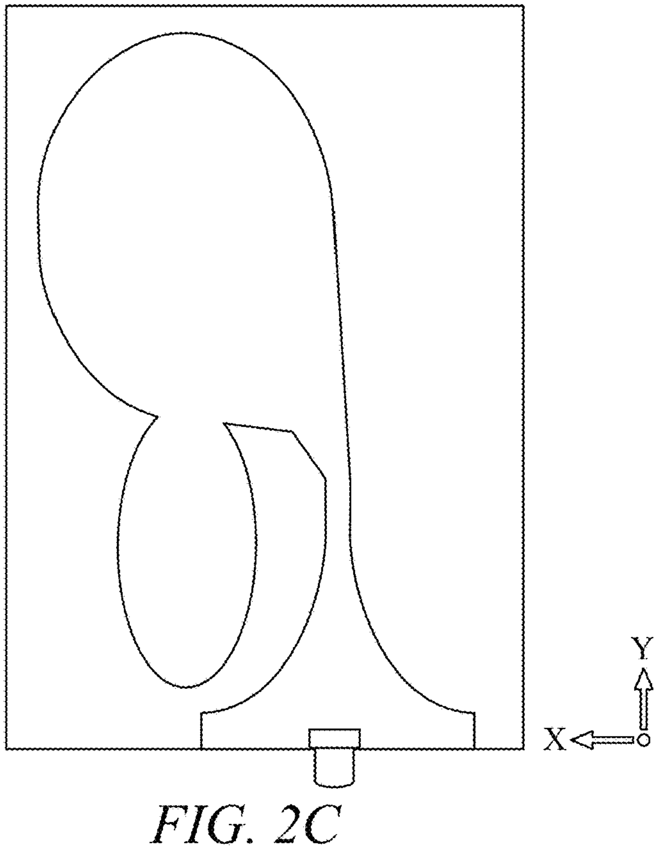
FIG. 2C shows a bottom layer view of SELS-AVA, according to certain embodiments.
Figure 2D:
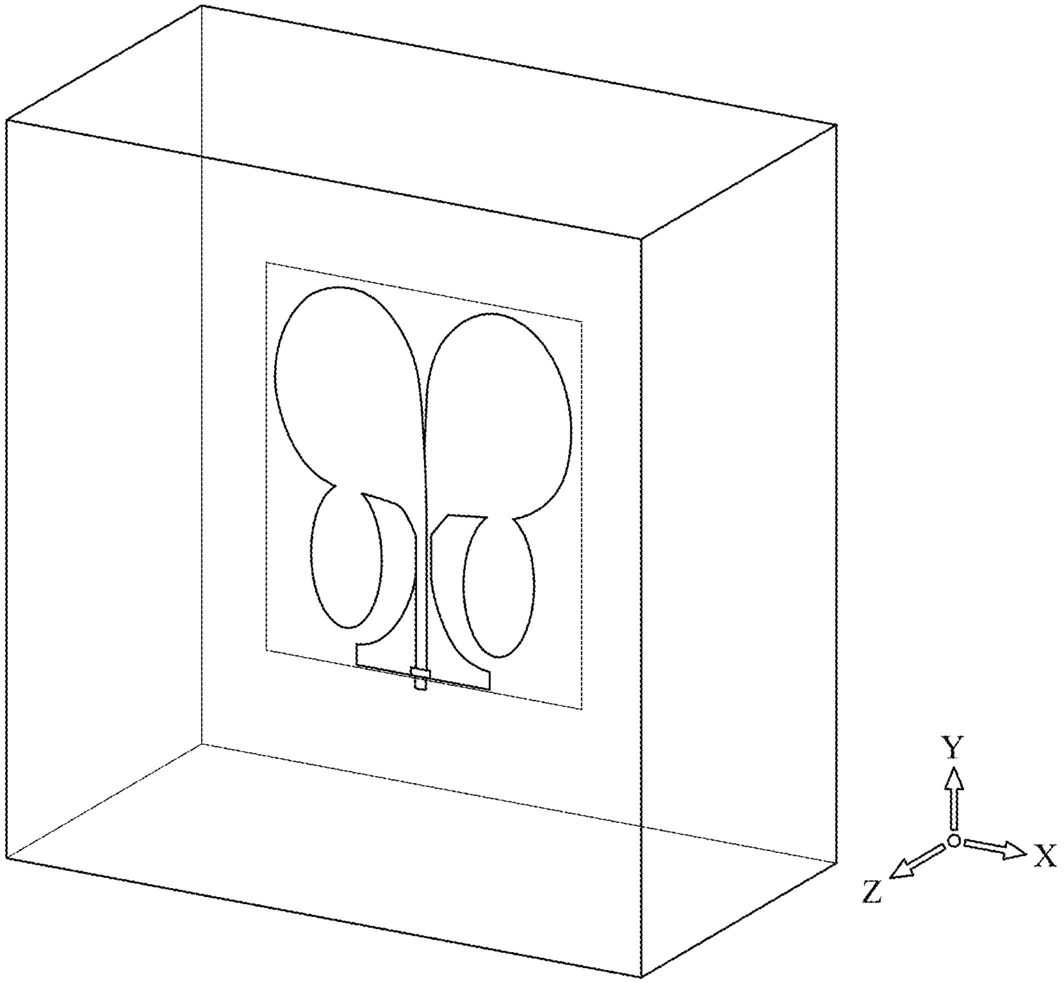
FIG. 2D shows a perspective layer view of SELS-AVA, according to certain embodiments.

FIG. 2B-FIG. 2D show different views of the SELS-AVA. FIG. 2B shows the top layer view of SELS-AVA. FIG. 2C shows the bottom layer view of SELS-AVA. FIG. 2D shows a perspective view of SELS-AVA.

Figure 3A:
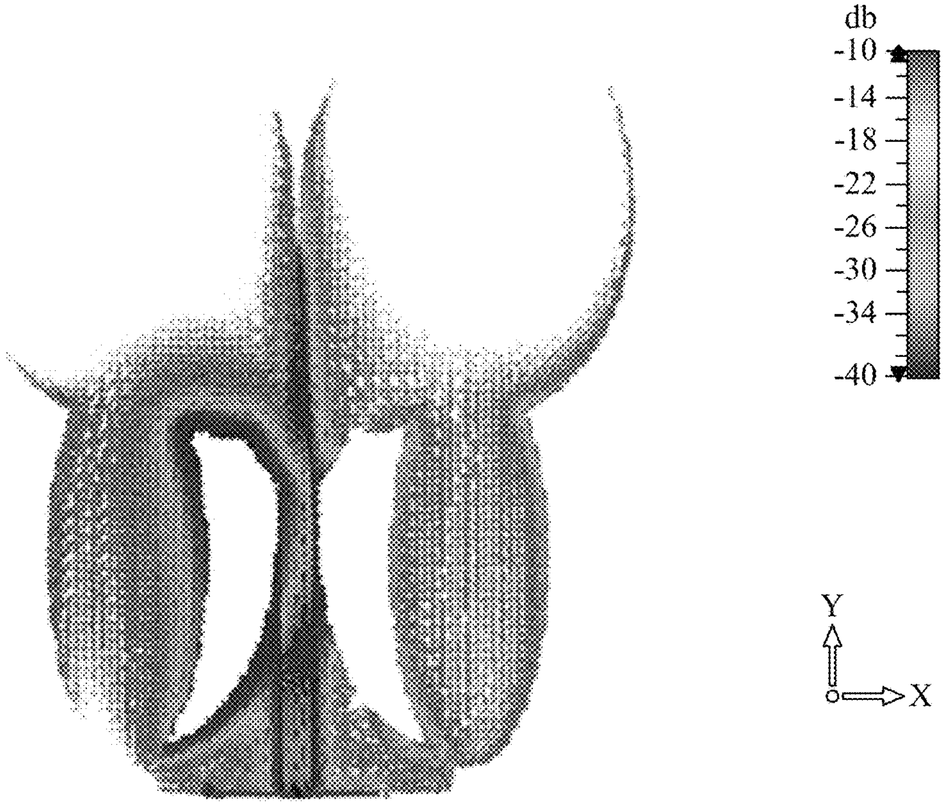
FIG. 3A illustrates the surface current distribution analysis of the SELS-AVA at a center frequency of 0.69 GHz, according to certain embodiments.
Figure 3B:
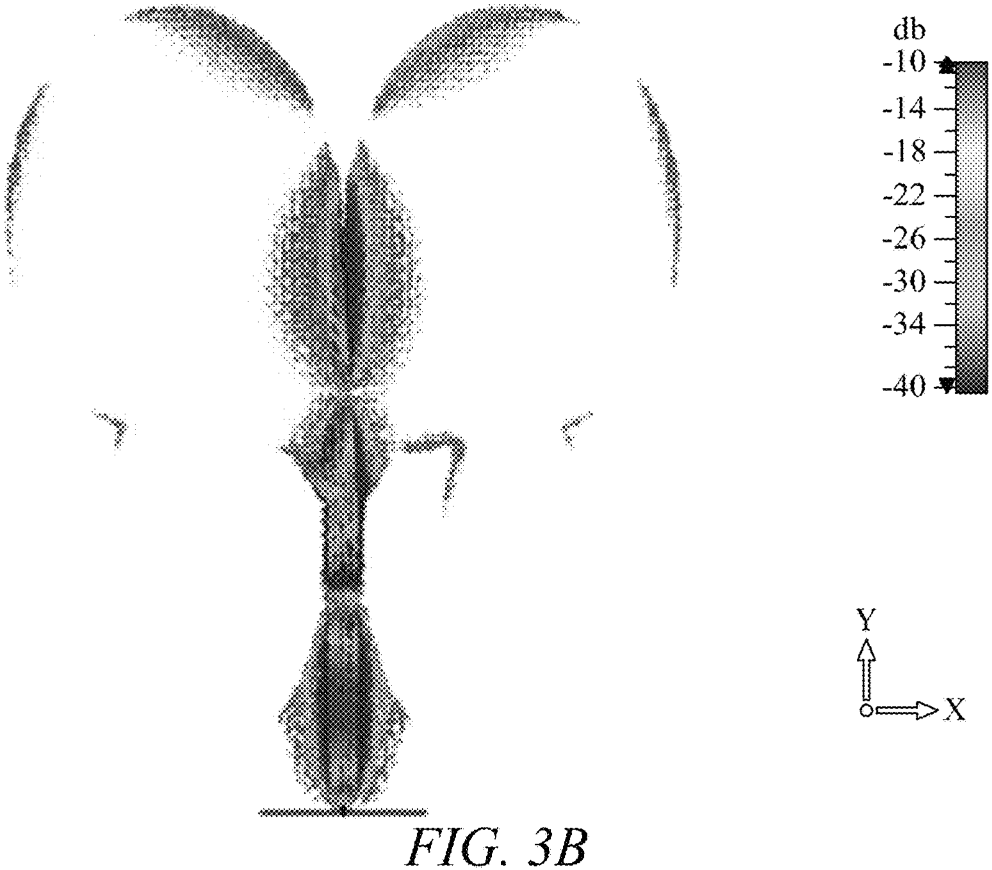
FIG. 3B illustrates the surface current distribution analysis of the SELS-AVA at a center frequency of 2.5 GHz, according to certain embodiments.

FIG. 3A and FIG. 3B illustrate the surface current distribution analysis of the SELS-AVA at frequencies of 0.69 GHz and 2.5 GHz respectively, in accordance with one embodiment. As shown in FIG. 3A, at the lower frequency of 0.69 GHz, the elliptical conducting strips significantly extend the electrical path for currents, enhancing the antenna's performance in this spectrum. Conversely, as shown in FIG. 3B, at the higher frequency of 2.5 GHZ, the elliptical conducting strips do not contribute markedly, with the peak surface current density centralizing in the antenna's core region. The surface current distribution, thus, demonstrates that the inclusion of the elliptical conducting strips influences the lower frequency response of the antenna, effectively lowering the operational frequency range without necessitating an increase in the antenna's physical aperture size. Therefore, in the parametric analysis, the frequency range can be limited to only the sub-2 GHz frequency band in order to reduce its computational cost.

FIG. 4A, 4B, 5A, 5B illustrate a graphical representation of the parametric analysis of the SELS-AVA. The parametric analysis within the sub-2 GHz band was conducted, specifically examining variables ar1 and ar2, to determine the impact of ar1 and ar2 on return loss and antenna gain.

Figure 4A:
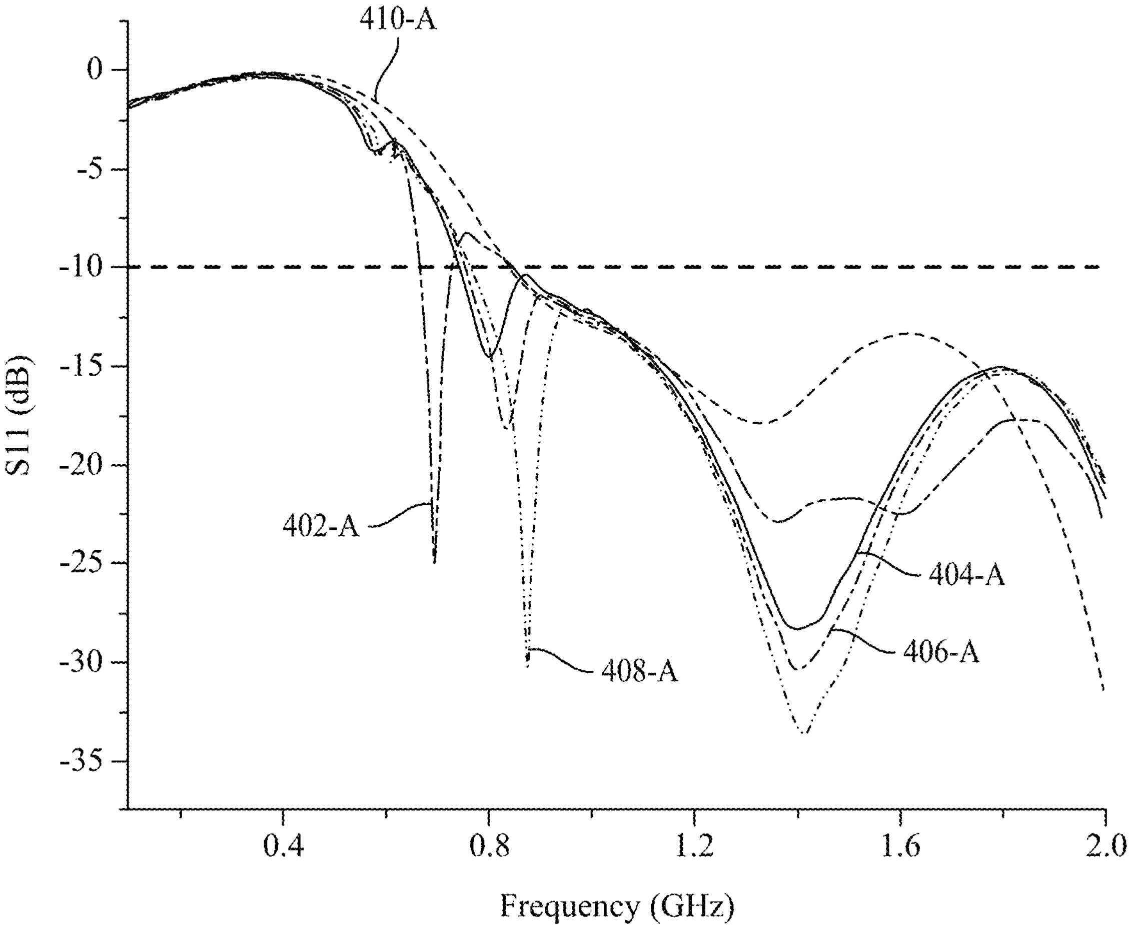
FIG. 4A illustrates the graphical representation of the impact of varying ar2 with constant ar1 on return loss, according to certain embodiments.

FIG. 4A illustrates a graphical representation of the impact of varying ar2 with constant ar1 on return loss. The graph is plotted between variable ar2 while ar1 is constant with respect to the S11 parameter. The S11 parameter, also known as the return loss, is a term used in radio frequency (RF) engineering and telecommunications to describe how much power is reflected from the port of a device, such as an antenna or a network analyzer. Curve 410-A is a result when ar2=20 mm. Curve 402-A is the result when ar2=30 mm. Curve 404-A is a result when ar2=35 mm. Curve 406-A is a result when ar2=37 mm. Curve 408-A is a result when ar2=40 mm.

Figure 4B:
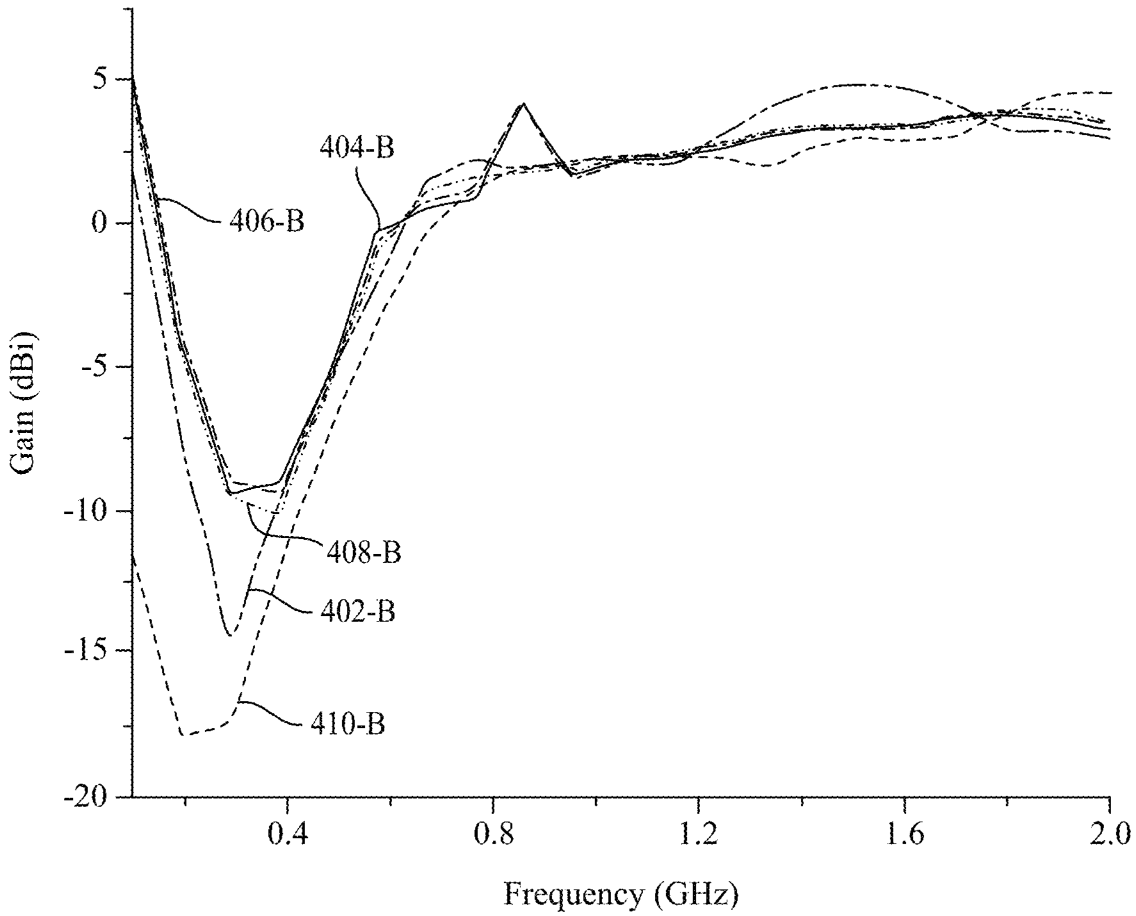
FIG. 4B illustrates the graphical representation of the impact of varying ar2 with constant ar1 on the antenna gain, according to certain embodiments.

FIG. 4B illustrates a graphical representation of the impact of varying ar2 with constant ar1 versus the antenna gain. The graph is plotted while varying ar2 while ar1 is held constant and recording the gain. Curve 402-B is a result when ar2=30 mm. Curve 404-B is a result when ar2=35 mm. Curve 406-B is a result when ar2=37 mm. Curve 408-B is a result when ar2=40 mm. Curve 410-B is the result when ar2=20 mm. It can be seen that the lower cut-off frequency can be shifted towards the left by increasing ar2. However, if the value of ar2 is increased by more than 40 mm then a narrow-band notch is created at about 800 MHz.

Figure 5A:
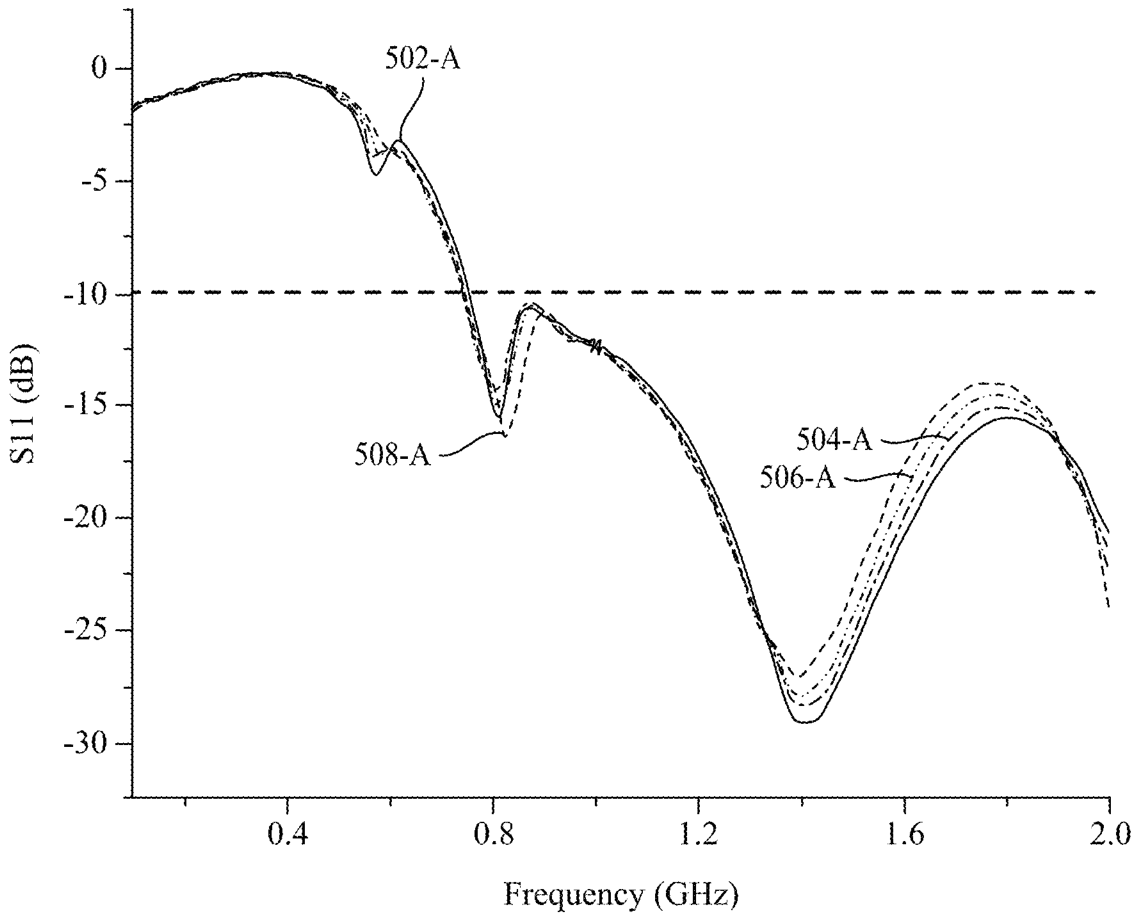
FIG. 5A illustrates the graphical representation of the impact of varying ar1 with constant ar2 on return loss, according to certain embodiments.

FIG. 5A illustrates the graphical representation of the impact of varying ar1 with constant ar2 on return loss. Curve 502-A is a result when ar1=20 mm. Curve 504-A is a result when ar1=15 mm. Curve 506-A is a result when ar1=10 mm. Curve 508-A is a result when ar1=5 mm.

Figure 5B:
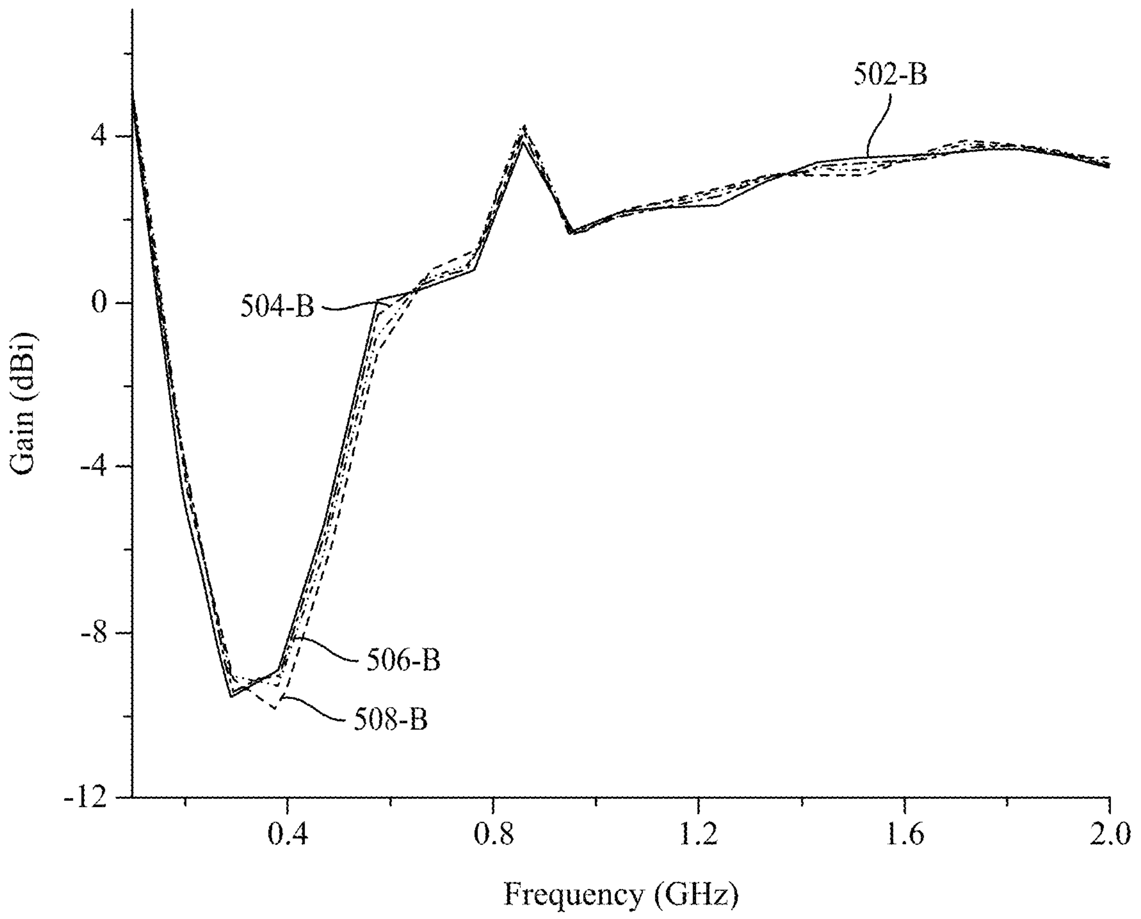
FIG. 5B illustrates the graphical representation of the impact of varying ar1 with constant ar2 on the antenna gain, according to certain embodiments.

FIG. 5B illustrates the graphical representation of the impact of varying ar1 with constant ar2 on the antenna gain. Curve 502-B is a result when ar1=20 mm. Curve 504-B is a result when ar1=10 mm. Curve 506-B is a result when ar1=15 mm. Curve 508-B is a result when ar1=5 mm. It was observed that adjusting ar2 lowered the cutoff frequency, while changes to ar1 had a minimal effect on performance. Optimal values for the SELS-AVA parameters were determined from the parametric analysis and are enlisted in Table 1 above.

Figure 6:
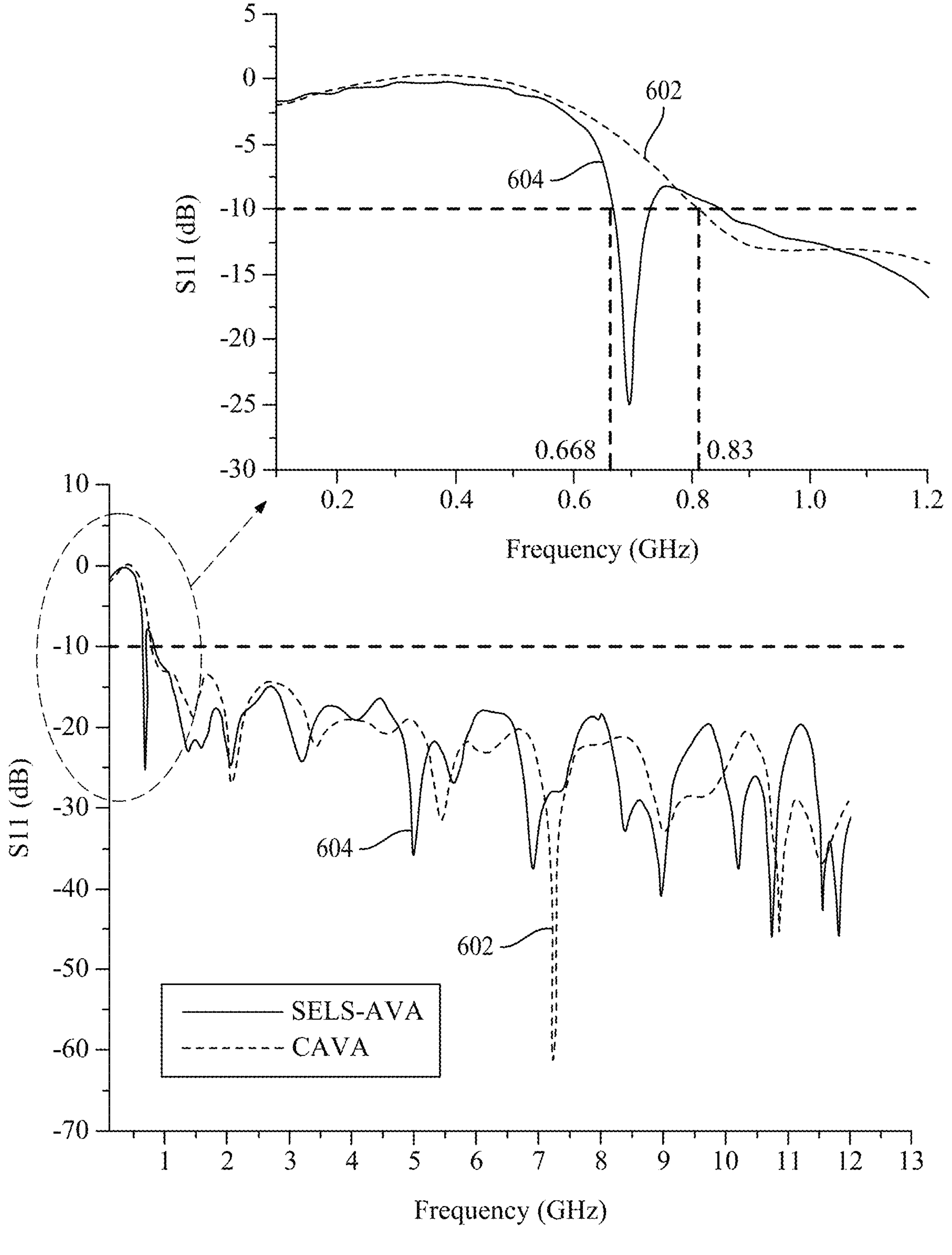
FIG. 6 is a graph comparing the return loss of the CAVA and the SELS-AVA, according to certain embodiments.

In order to enhance wideband antenna performance in the sub-2 GHz spectrum, the elliptical conducting strips were added to the CAVA, resulting in an optimized SELS-AVA. FIG. 6 demonstrates the comparative analysis of the CAVA and the SELS-AVA for the return loss. The graph is plotted for frequency range versus the S11 parameters. Curve 602 depicts the CAVA analysis. Curve 604 depicts the SELS-AVA analysis. The modification enables a shift in the lower cutoff frequency to 0.668 GHz, a notable reduction compared to the original 0.83 GHZ observed in the CAVA. The size of the antenna is effectively reduced by 19.5% to 0.359 $\lambda_L$×0.312 $\lambda_L$ without compromising performance.

The SELS-AVA was simulated and evaluated using two different computational techniques, one is finite-difference time-domain (FDTD) method and the other is the finite element method (FEM).

CST Microwave Studio (developed by Dassault Systèmes, 492 Old Connecticut Path, Suite 500, Framingham, MA 01701, United States of America) was used to implement both the mentioned computational techniques. These computational techniques are also compared to highlight the significance of the most suitable technique for miniaturization of a wideband antenna (0.66 to more than 14 GHZ) with a common PC (2.59 GHz Core i3 processor with 8 GB memory). Several simulations are carried out using FDTD with an increasing number of mesh cells until convergence is achieved. Mesh cells are used to discretize the computational volume of the antenna in electromagnetic simulations, and the type and technique of meshing plays a vital role in deciding the simulation speed, accuracy, and memory requirements. A mesh includes of a number of mesh cells which are hexahedrons in time domain (FDTD) simulations and tetrahedrons in case of frequency domain (FEM) simulations. In the present disclosure, the antenna performance was evaluated using both the time and frequency domain analysis and it was concluded that meshing using the FDTD stand outs because it offers a number of advantages over the techniques based on Finite Elements (FEM). FDTD is less memory demanding and solves larger problems using fewer computational resources in a shorter time.

Table 2 lists the FDTD statistics of the simulations for the SELS-AVA.

TABLE 2

FDTD statistics for SELS-AVA

| Cells per wave-length Near the Model | Smallest Cell Size (mm) | Largest Cell Size (mm) | Total Hexa-hedral Cells | Computation Time (M:S) |
|---|---|---|---|---|
| 5 | 0.524933 | 3.54365 | 830,484 | 3:29 |
| 6 | 0.49375 | 3.54365 | 1,183,506 | 7:53 |
| 7 | 0.3937 | 2.65773 | 1,936,494 | 34:9 |
| 8 | 0.3937 | 2.65773 | 2,500,911 | 40:09 |
| 9 | 0.33333 | 2.12619 | 3,582,864 | 45:06 |
| 10 | 0.31496 | 2.12619 | 4,620,000 | 32:07 |

Figure 7:
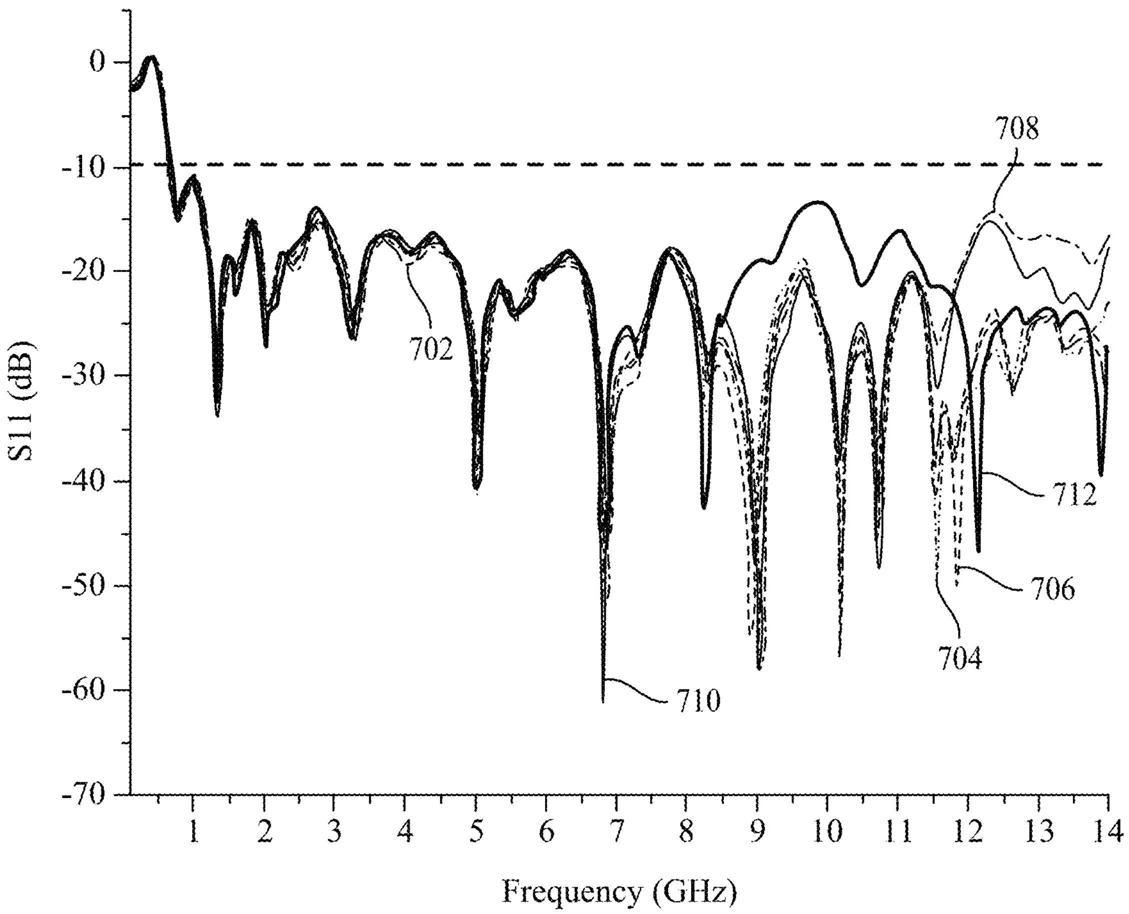
FIG. 7 illustrates a graphical representation of return loss of the SELS-AVA for varying mesh density calculated using FDTD, according to certain embodiments.

FIG. 7 is a graphical representation of the return loss of the SELS-AVA versus frequency for varying mesh density calculated using FDTD, in accordance with one embodiment. A graph is plotted against frequency and S11 parameters for varying number of mesh cells. A mesh cell is the smallest unit of the space in which an antenna or any other electromagnetic structure is divided for the purpose of numerical analysis using computational methods like the FDTD method or the FEM. Mesh density refers to the number of mesh cells per unit volume within the simulated space of the antenna. It is a measure of how finely the simulation space is divided. High mesh density means that the space is divided into a larger number of smaller cells, allowing for more detailed and accurate simulations of the electromagnetic fields. Conversely, lower mesh density uses fewer, larger cells and can result in less accurate simulations but requires less computational power and time.

Curve 702 is plotted for 830,484 mesh cells. Curve 704 is plotted for 1,183,506 mesh cells. Curve 706 is plotted for 1,936,494 mesh cells. Curve 708 is plotted for 2,500,911 mesh cells. Curve 710 is plotted for 3,582,864 mesh cells. Curve 712 is plotted for 4,620,000 mesh cells. It can be seen that the return loss converges for greater than 2,500,911 hexahedral mesh cells and the lowest cutoff frequency is obtained at 0.66 GHz.

Similarly, the SELS-AVA is analyzed using the FEM solver by increasing the number of tetrahedron mesh cells. The FEM computation statistics for various mesh densities are summarized in Table 3 and corresponding results for return loss are plotted in FIG. 8. The hexahedral shape is any polyhedron with six faces, three squares around each vertex.

TABLE 3

FEM statistics for SELS-AVA in Wideband

| Max no. of Passes | Edge Length Min. | Edge Length Max. | Average Quality | Total Tetra-hedrons | Computation Time (H:M:S) |
|---|---|---|---|---|---|
| 5 | 0.0608401 | 9.67442 | 0.755319 | 280,804 | 00:30:51 |
| 6 | 0.029147 | 9.49687 | 0.757769 | 446,414 | 00:17:41 |
| 7 | 0.0274142 | 9.51305 | 0.759502 | 611,627 | 00:15:11 |
| 15 | 0.0153071 | 9.44517 | 0.7606 | 799,307 | 21:44:42 |

Figure 8:
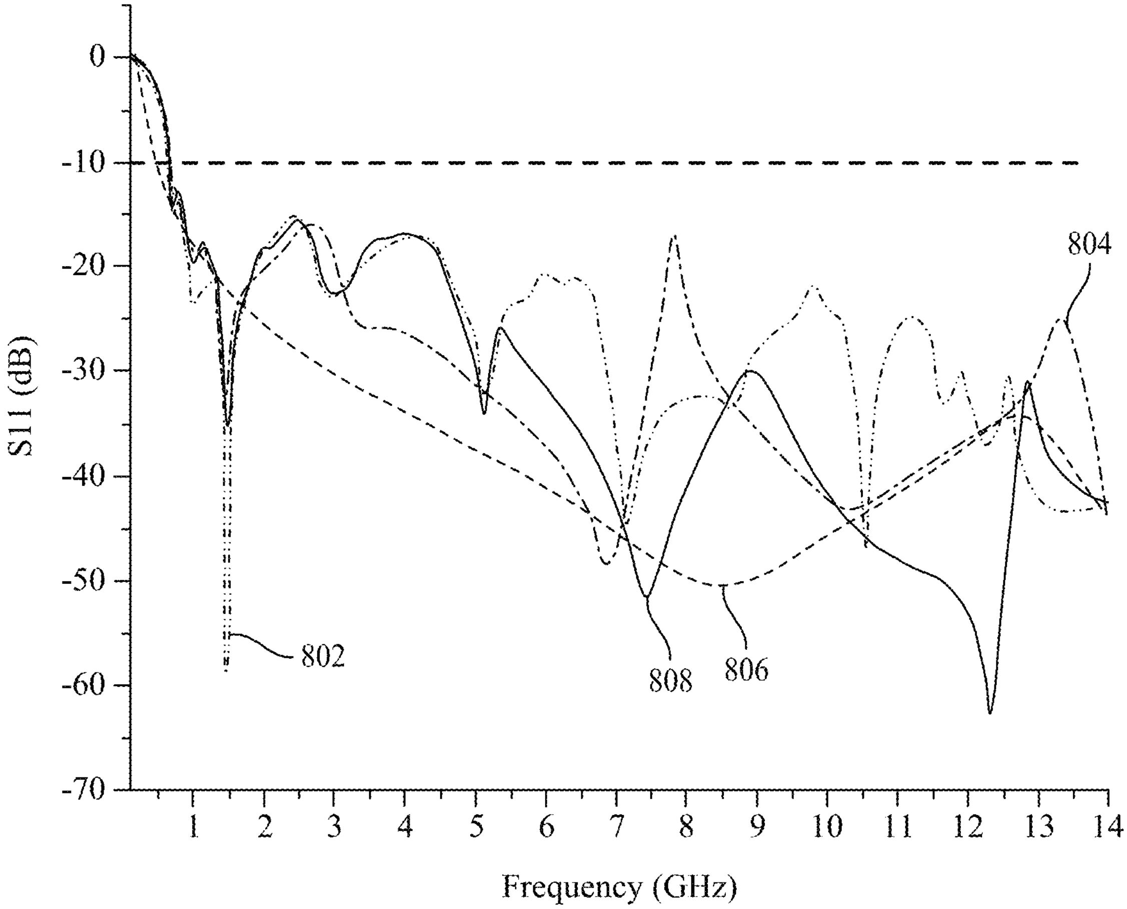
FIG. 8 illustrates a graphical representation of return loss of SELS-AVA for varying mesh density calculated using FEM, according to certain embodiments.

FIG. 8 illustrates a graphical representation of return loss of SELS-AVA for varying mesh density calculated using FEM, in accordance with one embodiment. Curve 802 is plotted for 280,804 tetrahedrons. Curve 804 is plotted for 466,414 tetrahedrons. Curve 806 is plotted for 611,627 tetrahedrons. Curve 808 is plotted for 799,307 tetrahedrons.

It can be seen that the FEM takes a long computation duration for wideband simulations as the mesh density increases, and convergence is difficult to achieve using FEM.

As known in the art, FEM is recognized for its efficacy in narrowband applications. Accordingly, the SELS-AVA of the present disclosure has been subjected to FEM analysis in segmented, narrow continuous frequency bands, as detailed in Table 4. This method for analyzing a wideband antenna using FEM in small chunks of the wide frequency bands helps to achieve converged results with considerably less computational cost as compared to FEM analysis for the whole frequency band in a single run; however, its computational cost is still higher than that of FDTD analysis. Therefore, FDTD is more computationally efficient than FEM for the analysis of the proposed SELS-AVA. However, the computational cost of FEM can also be reduced significantly by its analysis in small continuous chunks of the whole frequency band instead of analysis for the whole frequency band in a single run.

TABLE 4

FEM Statistics for SELS-AVA in Small Chunks of the Frequency Band

| Frequency Bands (GHz) | Max. no. of Passes | Total No. of Tetrahedron Cells | Run time (M:S) |
|---|---|---|---|
| 0.1-2 | 8 | 26,938 | 0:3 |
| 2-5 | 8 | 39,993 | 1:25 |
| 5-8 | 8 | 90,214 | 16:53 |
| 8-10 | 8 | 123,306 | 6:35 |
| 10-12 | 8 | 111,993 | 5:13 |
| 12-14 | 8 | 227,263 | 6:34 |

Figure 9:
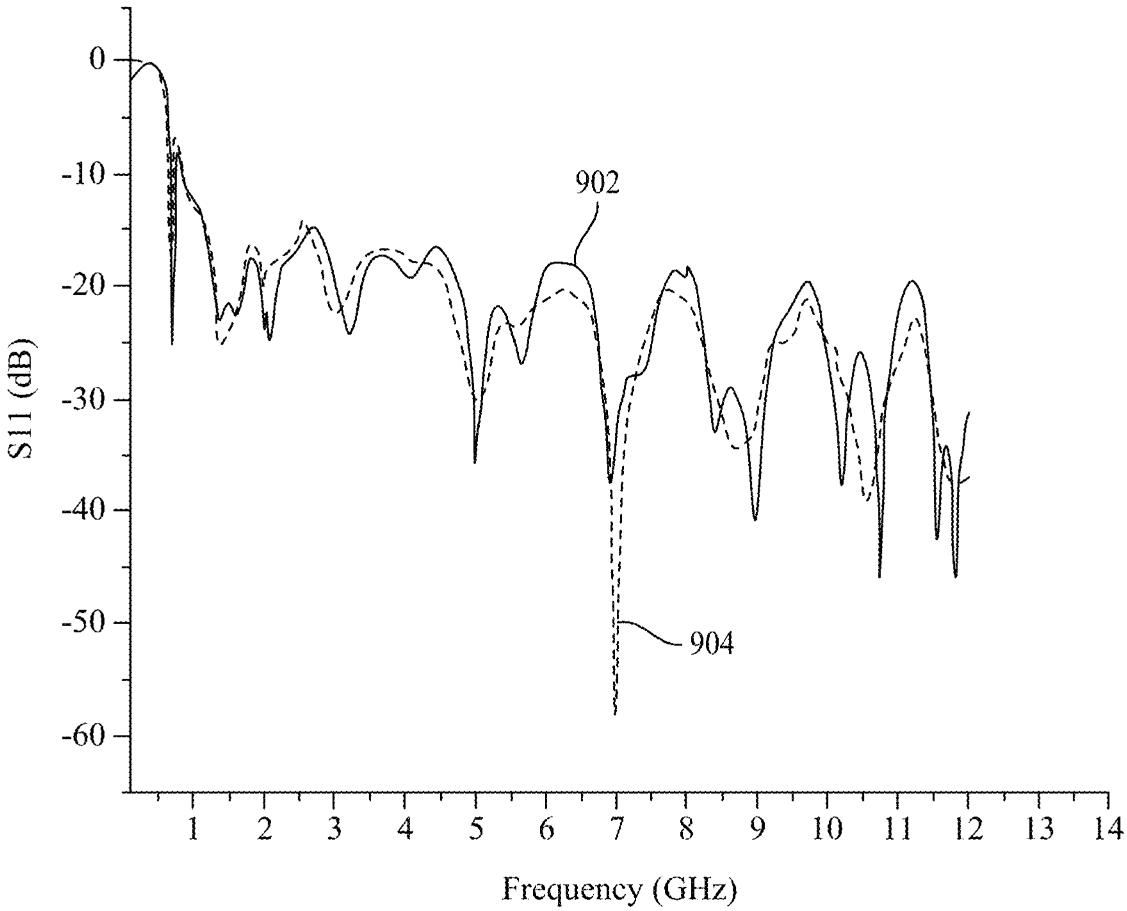
FIG. 9 illustrates the graphical representation of the comparison of the converged return loss curves for FDTD and FEM analysis for the SELS-AVA, according to certain embodiments.

FIG. 9 is a graphical representation of a comparison of the converged return loss curves for FDTD and FEM analysis for the SELS-AVA. Curve 902 indicates a return loss based on FDTD, and curve 904 indicates a return loss based on FEM. It can be seen that the return loss curves for both computational techniques are in close agreement.

Figure 10:
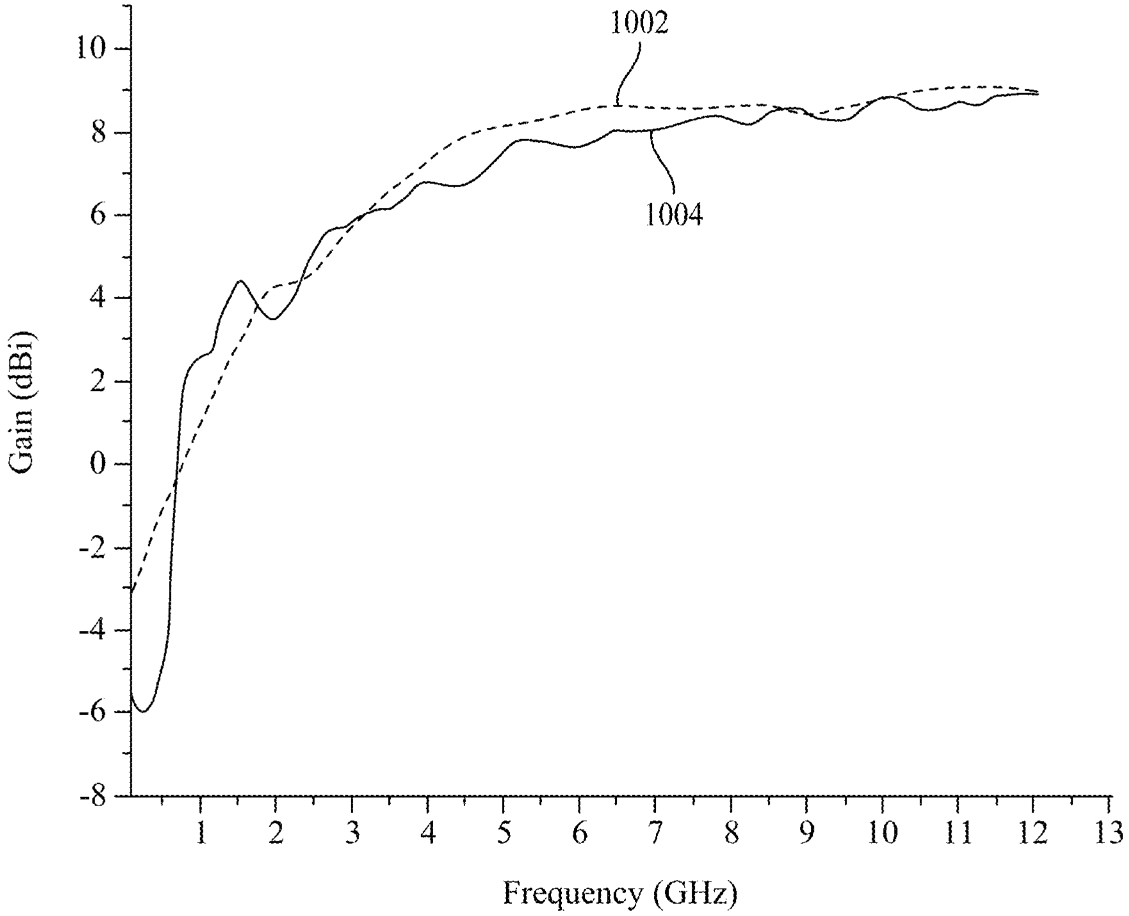
FIG. 10 illustrates the graphical representation of the comparison between the simulated gain of the SELS-AVA and the simulated gain of the CAVA, according to certain embodiments.

FIG. 10 is a graphical representation of a comparison between the simulated gain of the SELS-AVA and the simulated gain of the CAVA. Curve 1002 indicates the simulated gain of the CAVA, and curve 1004 indicates the simulated gain of the SELS-AVA. The peak gain offered by CAVA and SELS-AVA is 9.1 dBi and 9.5 dBi respectively. The peak gains offered by the two designs are similar. However, the performance of the SELS-AVA also exhibits suitable gain in sub-GHz frequency ranges.

The SELS-AVA is compared with some other recent AVAs in the literature. The comparison result is summarized in Table 5. The comparison is in terms of the operational frequency range, dielectric used, antenna size, and gain. It can be seen that the SELS-AVA achieves size reduction in the sub-GHz frequency band and its performance is also comparable with existing techniques implemented for antennas.

TABLE 5

Comparison of proposed AVA Design with known AVAs.

| Ref. | Band (GHz) | Size ($\lambda_L \times \lambda_L$) | $\varepsilon_r$ | Gain (dBi) |
|---|---|---|---|---|
| Reference 1 | 0.83-9.8 | 0.446 × 0.39 | 2.33 | 9.1 |
| Reference 2 | 0.3-2 | 0.6 × 0.45 | 3.48 | 4.4-11.5 |
| Reference 3 | 5.3-40 | 0.35 × 0.54 | 2.2 | 11 |
| Reference 4 | 11.02-40 | 0.84 × 0.367 | 2.2 | 2.15-5.75 |
| Reference 5 | 3-10.6 | 0.45 × 0.486 | 4.4 | 8.45 |
| Reference 6 | 1.76-10 | 0.46 × 1.26 | 4.4 | 15.83 |
| Reference 7 | 5.2-40 | 0.66 × 0.68 | 2.2 | 0.6-13.9 |
| Reference 8 | 25-33.4 | 0.67 × 0.4 | 4.4 | 5-9.53 |
| Reference 9 | 4.2-50 | 1.708 × 0.92 | 2.94 | 0-16.9 |
| Reference 10 | 1.14-2.6 | 0.6 × 0.5 | 4.15 | 8.2 |
| SELS-AVA | 0.668-20+ | 0.359 × 0.31 | 2.65 | 9.4 |

Reference 1: J. Y. Siddiqui, Y. Antar, A. Freundorfer, E. Smith, G. Morin, and T. Thayaparan, "*Design of an ultra-wideband antipodal tapered slot antenna using elliptical strip conductors*", IEEE Antennas Wireless Propag. Lett., vol. 10, pp. 251-254, 2011 (incorporated herein by reference in its entirety).

Reference 2: J. Guo, J. Tong, Q. Zhao, J. Jiao, J. Huo and C. Ma, "*An Ultrawide Band Antipodal Vivaldi Antenna for Airborne GPR Application*", in IEEE Geoscience and Remote Sensing Letters, vol. 16, no. 10, pp. 1560-1564 October 2019, doi: 10.1109/LGRS.2019.2905013 (incorporated herein by reference in its entirety).

Reference 3: Z. Yin, G. He, X.-X. Yang and S. Gao, "*Miniaturized Ultrawideband Half-Mode Vivaldi Antenna Based on Mirror Image Theory*", in *IEEE Antennas and Wireless Propagation Letters*, vol. 19, no. 4, pp. 695-699, April 2020, doi: 10.1109/LAWP.2020.2977503. (incorporated herein by reference in its entirety).

Reference 4: J.-Y. Deng, R. Cao, D. Sun, Y. Zhang, and L.-X. Guo, "*Bandwidth enhancement of an Antipodal Vivaldi antenna facilitated by double-ridged substrate-integrated waveguide*", IEEE Trans. Antennas Propag., vol. 68, no. 12, pp. 8192-8196, 2020 (incorporated herein by reference in its entirety).

Reference 5: S. Guruswamy, R. Chinniah, and K. Thangavelu, "*Design and implementation of compact ultra-wide-band Vivaldi antenna with directors for microwave-based imaging of breast cancer*", Analog Integrated Circuits Signal Process., vol. 108, no. 1, pp. 45-57, 2021 (incorporated herein by reference in its entirety).

Reference 6: Ghosh, Anindya & Chakravarty, Debashish & Chakrabarty, Ajay. (2021). "*Dielectric loaded directive Vivaldi antenna considering dispersion in near and far field*", International Journal of RF and Microwave Computer-Aided Engineering. 31. 10.1002/mmce.22677 (incorporated herein by reference in its entirety).

Reference 7: Z. Yin, X.-X. Yang, F. Yu, and S. Gao, "*A novel miniaturized antipodal Vivaldi antenna with high gain*", Microw. Opt. Technol. Lett., vol. 62, no. 1, pp. 418-424, 2020 (incorporated herein by reference in its entirety).

Reference 8: S. Dixit and S. Kumar, "*The enhanced gain and cost-effective Antipodal Vivaldi antenna for 5G commu-*

*nication applications*", Microw. Opt. Technol. Lett., vol. 62, no. 6, pp. 2365-2374, 2020 (incorporated herein by reference in its entirety).

Reference 9: Bhattacharjee, Anindita & Bhawal, Abhirup & Karmakar, Anirban & Saha, Anuradha. (2020) "*Design of an antipodal Vivaldi antenna with fractal-shaped dielectric slab for enhanced radiation characteristics*", Microwave and Optical Technology Letters. 62. 10.1002/mop.32274 (incorporated herein by reference in its entirety).

Reference 10: Loutridis, S. Kazici, O. V. Stukach, A. B. Mirmanov, and D. Caratelli, "*A novel class of super-elliptical Vivaldi antennas for ultra-wideband applications*", Adv. Radio Frequency Antennas Modern Commun. Medical Syst., 2020 (incorporated herein by reference in its entirety).

Figure 11:
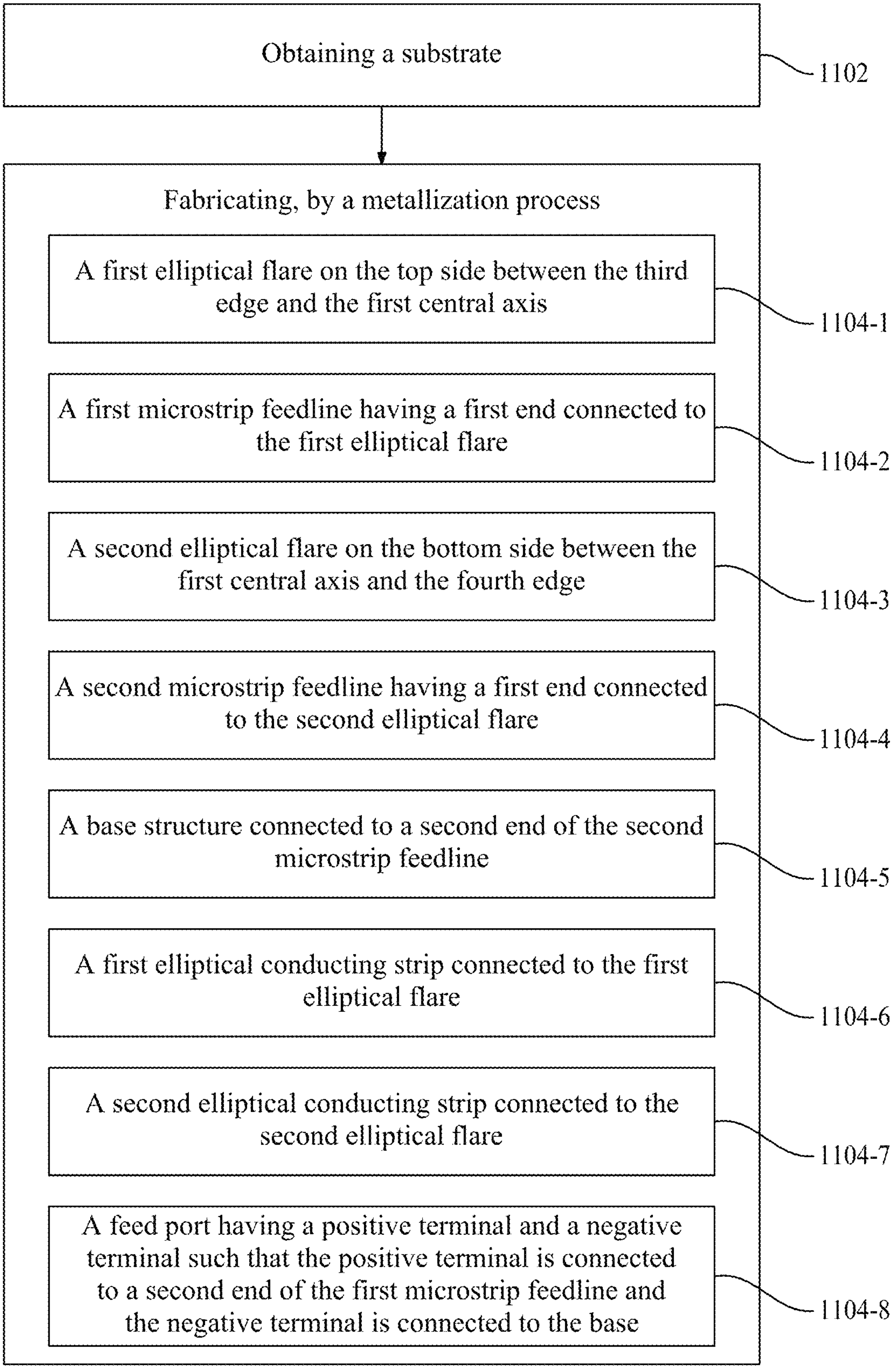
FIG. 11 depicts a method for fabricating a single elliptical loaded strip antipodal Vivaldi antenna (SELS-AVA), according to certain embodiments.

FIG. 11 depicts a method for fabricating a single elliptical loaded strip antipodal Vivaldi antenna (SELS-AVA), in accordance with an aspect of the present disclosure.

The method includes obtaining a substrate, at step 1102. The substrate includes a top side, a bottom side, a first edge 202, a second edge 204 parallel to the first edge 202, a third edge 206 perpendicular to the first edge 202 and the second edge 204, and a fourth edge 208 parallel to the third edge 206, a first central axis 210 which extends from the first edge 202 to the second edge 204, and a second central axis 212 which extends from the third edge 206 to the fourth edge 208.

The method step 1104-1 includes fabricating, by a metallization process, a first elliptical flare 214 on the top side between the third edge 206 and the first central axis 210 and between the first edge 202 and the second central axis 212, in the second quadrant (as defined in a rectangular coordinate system). The first elliptical flare 214 has a minor axis of length fr1 and a major axis of length fr2.

The method step 1104-2 includes fabricating, by a metallization process, a first microstrip feedline 218 having a first end connected to the first elliptical flare 214. The first microstrip feedline 218 is configured to extend from about the first central axis 210 to the fourth edge 208 and has a length centered on the second central axis 212.

The method step 1104-3 includes fabricating, by a metallization process, a second elliptical flare 216 on the bottom side between the first central axis 210 and the third edge 206 and between the second central axis 212 and the second edge 204, in the first quadrant of the substrate. The second elliptical flare 216 is a mirror image of the first elliptical flare 214 across the second central axis 212.

The method step 1104-4 includes fabricating, by a metallization process, a second microstrip feedline 220 having a first end connected to the second elliptical flare 216. The second microstrip feedline 220 is configured to extend from the first central axis 210 towards the fourth edge 284 and has a length centered on the second central axis 212.

The method step 1104-5 includes fabricating, by a metallization process, a base structure 222 connected to a second end of the second microstrip feedline 220.

The method step 1104-6 includes fabricating, by a metallization process, a first elliptical conducting strip 224 connected to the first elliptical flare 214. The first elliptical conducting strip 224 is located between the first edge 202 and the second central axis 212 and between the first central axis 210 and the fourth edge 208, in the third quadrant of the substrate. The first elliptical conducting strip 224 has a minor axis of length ar1 and a major axis of length ar2.

The method step 1104-7 includes fabricating, by a metallization process, a second elliptical conducting strip 226 connected to the second elliptical flare 216. The second elliptical conducting strip 226 is a mirror image of the first elliptical conducting strip 224. The second elliptical conducting strip 226 is located in the fourth quadrant of the substrate, between the first central axis 210 and the fourth edge 208 and between the second central axis 212 and the second edge 204.

The method step 1104-8 includes fabricating, by a metallization process, a feed port 228 having a positive terminal 230 and a negative terminal 232 such that the positive terminal 230 is connected to a second end of the first microstrip feedline 218 and the negative terminal 232 is connected to the base 222. The length ar1 is about 46% of the length fr1 and the length ar2 is about 88% of the length fr2. A length between the first edge 202 and the second edge 204 is about 0.359 $\lambda_L$ mm and a width between the third edge 206 and the fourth edge 208 is about 0.312 $\lambda_L$ mm, where $\lambda_L$ is a lower cut-off frequency of about 0.69 GHz of the SELS-AVA, and causing the SELS-AVA to radiate at the lower cut-off frequency $\lambda_L$ of about 0.69 GHz by applying an electrical signal to the feed port.

The present disclosure provides the SELS-AVA and a comparative computational analysis employing both the Finite-Difference Time-Domain (FDTD) and Finite Element Method (FEM) techniques. Miniaturization was achieved by strategically incorporating elliptical strips at locations of peak current density at lower frequencies, thereby increasing the electrical path without compromising antenna performance. The dimensions of the SELS-AVA were reduced to 0.359 λL by 0.312 λL, culminating in a 19.5% reduction in size relative to the CAVA. The SELS-AVA demonstrates a gain range of 1.3-2.2 dBi within the 0.668-1 GHz sub-GHz spectrum while maintaining satisfactory gain throughout its operational bandwidth.

Simulations utilizing FDTD and FEM solvers were conducted, with cross-validation of results affirming the fidelity of the findings. FDTD has been identified as a more resource-efficient approach for analyzing the proposed antenna, minimizing computational and memory requirements. Nevertheless, FEM remains a viable alternative for result verification, particularly when executed in segmented analyses over discrete frequency ranges, as opposed to a singular analysis over the entire spectrum. The synergy of performance, compactness, and simplicity positions the SELS-AVA as a valuable advancement for ultra-wideband and sub-GHz antenna applications.

A first embodiment is illustrated with respect to FIG. 1A-FIG. 11 and describes a single elliptical loaded strip antipodal Vivaldi antenna (SELS-AVA) which includes a substrate, a first central axis 210, and a second central axis 212. The substrate includes a top side, a bottom side, a first edge 202, a second edge 204 parallel to the first edge 202, a third edge 206 perpendicular to the first edge 202 and the second edge 204, and a fourth edge 208 parallel to the third edge 206. The first central axis 210 extends from the first edge 202 to the second edge 204. The second central axis 212 extends from the third edge 206 to the fourth edge 208. The SELS-AVA further includes a first elliptical flare 214 formed on the top side between the third edge 206 and the first central axis 210, and a first microstrip feedline 218 having a first end connected to the first elliptical flare 214. The first microstrip feedline 218 is configured to extend from the first central axis 210 to the fourth edge 208 and has a length centered on the second central axis 210.

The SELS-AVA further includes a second elliptical flare 216 formed on the bottom side between the first central axis 210 and the third edge 206. The second elliptical flare 216 is a mirror image of the first elliptical flare 214 about the second central axis 212. The SELS-AVA has a second microstrip feedline 220 having a first end connected to the second elliptical flare 216. The second microstrip feedline 220 is configured to extend from the first central axis 210 towards the fourth edge 208 and has a length centered on the second central axis 212.

The SELS-AVA also includes a base structure 222 connected to a second end of the second microstrip feedline 220, a first elliptical conducting strip 224 connected to the first elliptical flare 214, and a second elliptical conducting strip 226 connected to the second elliptical flare 216. The first elliptical conducting strip 224 is located between the fourth edge 208 and the first central axis 210 and between the second central axis 212 and the first edge 202, in the third quadrant of the substrate. A second elliptical conducting strip 226 is located in the fourth quadrant between the first central axis 210 and the fourth edge 208 and between the second central axis 212 and the second edge 204. The second elliptical conducting strip 226 is a mirror image of the first elliptical conducting strip 224.

The SELS-AVA further includes a feed port 228 having a positive terminal 230 and a negative terminal 232. The positive terminal 230 is connected to a second end of the first microstrip feedline 218 and the negative terminal 232 is connected to the base 222. The SELS-AVA is configured to radiate at a lower cut-off frequency $\lambda_L$ of about 0.69 GHz when an electrical signal is applied to the feed port.

In one aspect, the minor axis of length fr1 of the first elliptical flare 214 is parallel to the second central axis 212 and to a minor axis of length ar1 of the first elliptical conducting strip 224. The major axis of length fr2 of the first elliptical flare 214 is contiguous with a major axis of length ar2 of the first elliptical conducting strip 224. The major axis of the first elliptical flare 214 is parallel to the second central axis 212. The major axis of the second elliptical flare 216 is contiguous with a major axis of the second elliptical conducting strip 226, wherein the major axis of the second elliptical flare 216 is parallel to the second central axis 212.

In one aspect, the first elliptical conducting strip 224 is located between the fourth edge 208 and the first central axis 210 and between the second central axis 212 and the first edge 202, wherein the length ar1 is about 46% of the length fr1 and the length ar2 is about 88% of the length fr2.

In one aspect, the first tapered structure is configured to connect the first end of the first microstrip feedline 218 to a portion of the first elliptical flare 214 which is contiguous with the second central axis 212, wherein the first tapered structure forms an angle of about 132 degrees with the first elliptical flare 214 and forms angle of about 145 degrees with the first microstrip feedline 218. The second tapered structure is configured to connect the first end of the second microstrip feedline 220 to a portion of the second elliptical flare 216 which is contiguous with the second central axis 212, wherein the second tapered structure forms an angle of about 132 degrees with the second elliptical flare 216 and forms an angle of about 145 degrees with the second microstrip feedline 220.

In one aspect, the base 222 includes a tapered section and a rectangular section. The tapered section is configured to taper from the second end of the second microstrip feedline 220 along a circular curve on either side of the tapered section to the rectangular section. The second microstrip feedline 220 and the base are centered about the second central axis 212. In one aspect, the rectangular section is configured to fit within an opening of the feed port 228.

In one aspect, the first elliptical flare 214, the first elliptical conducting strip 224, the first microstrip feedline 218 and the first tapered structure are a unitary structure fabricated in a metallic material on the top side of the substrate during a metallization process.

In one aspect, the second elliptical flare 216, the second elliptical conducting strip 226, the second microstrip feedline 220, the second tapered structure and the base are a unitary structure fabricated in the metallic material on the bottom side of the substrate during the metallization process.

In one aspect, the metallization process is a printing process which uses conductive ink.

In one aspect, the first layer is formed of the metallic material covering the top side of the substrate. The second layer is formed of the metallic material covering the bottom side of the substrate. The metallization process comprises etching the first layer and the second layer.

In one aspect, the metallic material is one of copper, silver, gold, iridium, aluminum and graphene.

In one aspect, the length between the first edge 202 and the second edge 204 is about 0.359 $\lambda_L$ mm and a width between the third edge 206 and the fourth edge 208 is about 0.312 $\lambda_L$ mm.

In one aspect, the SELS-AVA is configured to operate with a gain of in a range of about 1.3 $dB_i$ to about 2.2 $dB_i$ in a frequency range of about 0.668 GHz to about 1.0 GHz, and to have a peak gain of about 9.5 $dB_i$ in a frequency range of about 5 GHz to about 20 GHz.

The second embodiment is illustrated with respect to FIG. 1A-FIG. 11 in which method is described for fabricating a single elliptical loaded strip antipodal Vivaldi antenna (SELS-AVA) includes obtaining a substrate including a top side, a bottom side, a first edge 202, a second edge 204 parallel to the first edge 202, a third edge 206 perpendicular to the first edge 202 and the second edge 204, and a fourth edge 208 parallel to the third edge 206, a first central axis 210 which extends from the first edge 202 to the second edge 204, and a second central axis 212 which extends from the third edge 206 to the fourth edge 208. The method further includes fabricating, by a metallization process, a first elliptical flare 214 on the top side between the third edge 206 and the first central axis 210. The first elliptical flare 214 has a minor axis of length fr1 and a major axis of length fr2. The method further includes fabricating, by the metallization process, a first microstrip feedline 218 having a first end connected to the first elliptical flare 214. The first microstrip feedline 218 is configured to extend from the first central axis 210 to the fourth edge 208 and has a length centered on the second central axis 212. The method further includes fabricating, by a metallization process, a second elliptical flare 216 on the bottom side between the first central axis 210 and the third edge 206. The second elliptical flare 216 is a mirror image of the first elliptical flare 214. The method further includes fabricating, by a metallization process, a second microstrip feedline 220 having a first end connected to the second elliptical flare 216. The second microstrip feedline 220 is configured to extend from the first central axis 210 towards the fourth edge 208 and has a length centered on the second central axis 212. The method further includes fabricating, by the metallization process, a base structure (110, 222) connected to a second end of the second microstrip feedline 220. The method further includes fabricating, by a metallization process, a first elliptical conducting strip 224 connected to the first elliptical flare 214. The first elliptical conducting strip 224 is located between the fourth edge 208 and the first central axis 210 and between the second central axis 212 and the first edge 202. The first elliptical conducting strip 224 has a minor axis of length ar1 and a major axis of length ar2. The method further includes fabricating, by the metallization process, a second elliptical conducting strip 226 connected to the second elliptical flare 216. The second elliptical conducting strip 226 is a mirror image of the first elliptical conducting strip 224 about the second central axis 212. The second elliptical conducting strip 226 is located between the first central axis 210 and the fourth edge 208 and between the second central axis 212 and the second edge 204. The method further includes fabricating, by the metallization process, a feed port 228 having a positive terminal 230 and a negative terminal 232 such that the positive terminal 230 is connected to a second end of the first microstrip feedline 218 and the negative terminal 232 is connected to the base, which is connected to ground. In one aspect of the method, the length ar1 is about half of the length fr1 and the length ar2 is about 88% of the length fr2, a length between the first edge 202 and the second edge 204 is about 0.359 $\lambda_L$ mm and a width between the third edge 206 and the fourth edge 208 is about 0.312 $\lambda_L$ mm, where $\lambda_L$ is a lower cut-off frequency of about 0.69 GHz of the SELS-AVA. Applying an electrical signal to the feed port causes the SELS-AVA to radiate at the lower cut-off frequency $\lambda_L$ of about 0.69 GHz.

In an aspect, the length ar1 is about 46% of the length fr1 and the length ar2 is about 88% of the length fr2.

In one aspect, the method includes determining, by a parametric analysis, the length ar1 and ar2. The parametric analysis includes varying the length ar2 versus frequency and determining the length ar2 and frequency at which the return loss is −10 dB, and varying the length ar2 versus frequency and determining the length ar2 and frequency at which a gain is −10 dBi.

In one aspect, the method includes connecting the first end of the first microstrip feedline 218 to a portion of the first elliptical flare 214 which is contiguous with the second central axis 212 by fabricating a first tapered structure which forms an angle of about 132 degrees with the first elliptical flare 214 and forms an angle of about 145 degrees with the first microstrip feedline 218, and connecting the first end of the second microstrip feedline 220 to a portion of the second elliptical flare 216 which is contiguous with the second central axis 212 by fabricating a second tapered structure which forms an angle of about 132 degrees with the second elliptical flare 216 and forms an angle of about 145 degrees with the second microstrip feedline 220.

In one aspect, the method includes fabricating the base to include a tapered section and a rectangular section, wherein the tapered section is configured to taper from the second end of the second microstrip feedline 220 along a circular curve on either side of the tapered section to the rectangular section, wherein the second microstrip feedline 220 and the base are centered about the second central axis 210. The rectangular section is configured to fit within an opening of the feed port 228.

In one aspect, the method includes a printing process which uses conductive ink, and etching a first layer formed of the metallic material which covers the top side of the substrate and etching a second layer formed of the metallic material which covers the bottom side of the substrate.

The third embodiment is illustrated with respect to FIG. 1A-FIG. 11 in which a method for transmitting signals with a single elliptical loaded strip antipodal Vivaldi antenna (SELS-AVA) is described. The method includes applying an electrical signal to a feed port 228 having a positive terminal 230 and a negative terminal 232 such that the positive terminal 230 is connected to a first microstrip feedline 218 and the negative terminal 232 is connected to a base of a second microstrip feedline 220, wherein the first microstrip feedline 218 is connected to a first elliptical flare 214, which is connected to a first elliptical conducting strip 224; the second microstrip feedline 216 is connected to a second elliptical flare 216 connected to a second elliptical conducting strip 226, wherein the second elliptical flare 216 and the second elliptical conducting strip 226 are mirror images of the first elliptical flare 214 and the first elliptical conducting strip 224, respectively. The method further includes transmitting the electrical signals by the SELS-AVA, wherein the SELS-AVA resonates at a lower cut-off frequency $\lambda_L$ of about 0.69 GHz in a lower frequency range and has a peak gain of about 9.5 $dB_i$ in an upper frequency range of about 5 GHz to about 20 GHz.

Numerous modifications and variations of the present disclosure are possible in light of the above teachings. It is therefore to be understood that within the scope of the appended claims, the invention may be practiced otherwise than as specifically described herein.

The invention claimed is:

1. A method for fabricating a single elliptical loaded strip antipodal Vivaldi antenna (SELS-AVA), comprising:

obtaining a substrate including a top side, a bottom side, a first edge, a second edge parallel to the first edge, a third edge perpendicular to the first edge and the second edge, and a fourth edge parallel to the third edge, a first central axis which extends from the first edge to the second edge, and a second central axis which extends from the third edge to the fourth edge;

fabricating, by a metallization process:

a first elliptical flare on the top side between the third edge and the first central axis, wherein the first elliptical flare has a minor axis of length fr1 and a major axis of length fr2;

a first microstrip feedline having a first end connected to the first elliptical flare, wherein the first microstrip feedline is configured to extend from the second central axis to the second edge and has a length centered on the first central axis;

a second elliptical flare on the bottom side between the first central axis and the fourth edge, wherein the second elliptical flare is a mirror image of the first elliptical flare;

a second microstrip feedline having a first end connected to the second elliptical flare, wherein the second microstrip feedline is configured to extend from the second central axis towards the second edge and has a length centered on the first central axis;

a base structure connected to a second end of the second microstrip feedline;

a first elliptical conducting strip connected to the first elliptical flare, wherein the first elliptical conducting strip is located between the third edge and the first central axis and between the second central axis and the second edge, wherein the first elliptical conducting strip has a minor axis of length ar1 and a major axis of length ar2; and a second elliptical conducting strip connected to the second elliptical flare, wherein the second elliptical conducting strip is a mirror image of the first elliptical conducting strip, wherein the second elliptical conducting strip is located between the first central axis and the fourth edge and between the second central axis and the second edge;

a feed port having a positive terminal and a negative terminal such that the positive terminal is connected to a second end of the first microstrip feedline and the negative terminal is connected to the base, wherein the length ar1 is about 46% of the length fr1 and the length ar2 is about 88% of the length fr2, wherein a length between the first edge and the second edge is about 0.359 $\lambda_L$ mm and a width between the third edge and the fourth edge is about 0.312 $\lambda_L$ mm, where $\lambda_L$ is a lower cut-off frequency of about 0.69 GHz of the SELS-AVA, and causing the SELS-AVA to radiate at the lower cut-off frequency $\lambda_L$ of about 0.69 GHz by applying an electrical signal to the feed port, wherein fabricating comprises one of:

a printing process which uses conductive ink; and etching a first layer formed of the metallic material which covers the top side of the substrate and etching a second layer formed of the metallic material which covers the bottom side of the substrate.

2. The method of claim 1, wherein the length ar1 is about 46% of the length fr1 and the length ar2 is about 88% of the length fr2.

3. The method of claim 1, further comprising:

determining, by a parametric analysis, the length ar1 and ar2, wherein the parametric analysis includes:

varying the length ar2 versus frequency and determining the length ar2 and frequency at which the return loss is −10 dB, and varying the length ar2 versus frequency and determining the length ar2 and frequency at which a gain is −10 dBi.

4. The method of claim 1, further comprising:

connecting the first end of the first microstrip feedline to a portion of the first elliptical flare which is contiguous with the second central axis by fabricating a first tapered structure which forms an angle of about 132 degrees with the first elliptical flare and forms an angle of about 145 degrees with the first microstrip feedline; and connecting the first end of the second microstrip feedline to a portion of the second elliptical flare which is contiguous with the second central axis by fabricating a second tapered structure which forms an angle of about 132 degrees with the second elliptical flare and forms an angle of about 145 degrees with the second microstrip feedline.

5. The method of claim 1, further comprising:

fabricating the base to include a tapered section and a rectangular section, wherein the tapered section is configured to taper from the second end of the second microstrip feedline along a circular curve on either side of the tapered section to the rectangular section, wherein the second microstrip feedline and the base are centered about the first central axis, wherein the rectangular section is configured to fit within an opening of the feed port.

* * * * *